US012586714B2

(12) United States Patent
Yoshioka

(10) Patent No.: US 12,586,714 B2
(45) Date of Patent: Mar. 24, 2026

(54) INDUCTOR COMPONENT

(71) Applicant: Murata Manufacturing Co., Ltd., Kyoto-fu (JP)

(72) Inventor: Yoshimasa Yoshioka, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 833 days.

(21) Appl. No.: 18/046,419

(22) Filed: Oct. 13, 2022

(65) Prior Publication Data

US 2023/0128955 A1 Apr. 27, 2023

(30) Foreign Application Priority Data

Oct. 21, 2021 (JP) ................................ 2021-172606

(51) Int. Cl.

| | |
|---|---|
| ***H01F 27/29*** | (2006.01) |
| ***H01F 1/20*** | (2006.01) |
| ***H01F 1/34*** | (2006.01) |
| ***H01F 27/28*** | (2006.01) |
| ***H01F 41/12*** | (2006.01) |

(52) U.S. Cl.

CPC ............ *H01F 27/292* (2013.01); *H01F 1/20* (2013.01); *H01F 1/342* (2013.01); *H01F 27/2823* (2013.01); *H01F 41/12* (2013.01)

(58) Field of Classification Search

CPC .......... H01F 27/292; H01F 1/20; H01F 1/342; H01F 27/2823; H01F 41/12

See application file for complete search history.

(56) References Cited

U.S. PATENT DOCUMENTS

2017/0278624 A1* 9/2017 Ogino .................... H01F 27/32
2018/0075965 A1* 3/2018 Yoshioka ............ H01F 27/2823
2019/0362873 A1* 11/2019 Arai ...................... H01F 27/292
(Continued)

FOREIGN PATENT DOCUMENTS

CN 113394192 A 9/2021
JP 2009094438 A * 4/2009
(Continued)

OTHER PUBLICATIONS

Japanese Decision to Grant a Patent, Patent Application Number: Japanese Patent Application No. 2021 to 172606, Apr. 15, 2024 (Year: 2024).*

*Primary Examiner* — Malcolm Barnes
(74) *Attorney, Agent, or Firm* — Studebaker Brackett PLLC

(57) ABSTRACT

An inductor component is capable of suppressing formation of a leak path between vertical wires. Such an inductor component includes an element body that includes a plurality of magnetic powders, at least one of which contains an Fe element as a main component, and has a first principal surface and a second principal surface; an inductor wire that is provided in the element body and extends along a plane parallel to the first principal surface; a vertical wire that is provided in the element body, is connected to an end of the inductor wire, and extends to the first principal surface in a direction orthogonal to the first principal surface; and a conductive protection film that covers at least a part of a side surface of the vertical wire extending along a direction orthogonal to the first principal surface and has a higher hardness than the vertical wire.

20 Claims, 18 Drawing Sheets

(56) References Cited

U.S. PATENT DOCUMENTS

| | | | | |
|---|---|---|---|---|
| 2020/0027638 | A1* | 1/2020 | Taguchi | H01F 27/292 |
| 2022/0319747 | A1* | 10/2022 | Nakajima | H01F 17/04 |

FOREIGN PATENT DOCUMENTS

| | | | |
|---|---|---|---|
| JP | 6024243 | B2 | 11/2016 |
| JP | 2018-046051 | A | 3/2018 |
| JP | 2021-136308 | A | 9/2021 |

* cited by examiner

INDUCTOR COMPONENT

CROSS-REFERENCE TO RELATED APPLICATION

This application claims benefit of priority to Japanese Patent Application No. 2021-172606 filed Oct. 21, 2021, the entire content of which is incorporated herein by reference.

BACKGROUND

Technical Field

The present disclosure relates to an inductor component.

Background Art

Conventionally, as an inductor component, there is an inductor component described in Japanese Patent No. 6024243. The inductor component described in Japanese Patent No. 6024243 includes an element body containing metal magnetic powder, an inductor wire provided in the element body, and two vertical wires provided in the element body, connected to both ends of the inductor wire, and extending to a principal surface of the element body. The element body includes a resin (hereinafter, referred to as the "metal magnetic powder-containing resin") containing the metal magnetic powder.

Incidentally, it has been found that the inductor component described in Japanese Patent No. 6024243 has the following problems. After the vertical wire is formed, when the vertical wire is covered with the metal magnetic powder-containing resin, the metal magnetic powder excessively enters a side surface of the vertical wire, and a contact area between the metal magnetic powder and the vertical wire increases. As a result, there is a problem that a leak path is formed between the vertical wires.

SUMMARY

Therefore, the present disclosure provides an inductor component capable of suppressing formation of a leak path between vertical wires.

An inductor component according to an aspect of the present disclosure includes an element body that includes a plurality of magnetic powders at least one of which contains an Fe element as a main component and has a first principal surface and a second principal surface; and an inductor wire that is provided in the element body and extends along a plane parallel to the first principal surface. The inductor component further includes a vertical wire that is provided in the element body, is connected to an end of the inductor wire, and extends to the first principal surface in a direction orthogonal to the first principal surface; and a conductive protection film that covers at least a part of a side surface of the vertical wire extending along a direction orthogonal to the first principal surface and has a higher hardness than the vertical wire.

According to the above aspect, since at least a part of the side surface of the vertical wire is covered with the conductive protection film having the higher hardness than the vertical wire, entry of the conductive protection film and the magnetic powder into the vertical wire can be reduced. Therefore, a contact area between the conductive protection film and the magnetic powder can be reduced while a contact area between the vertical wire and the conductive protection film at the entry portion is reduced, and a conduction path between the vertical wire and the magnetic powder can be reduced. As a result, when vertical wires are provided at both ends of the inductor wire or a plurality of inductor wires are provided, it is possible to suppress formation of a leak path between the vertical wires.

Preferably, in an embodiment of the inductor component, the conductive protection film is in contact with at least one of the plurality of magnetic powders, and the magnetic powder in contact is in contact with the conductive protection film without entering the side surface of the vertical wire.

According to the above embodiment, the conduction path between the vertical wire and the magnetic powder can be further reduced, and the formation of the leak path between the vertical wires can be suppressed when the vertical wires are provided at both ends of the inductor wire or when a plurality of inductor wires are provided. Note that the fact that the magnetic powder does not enter the side surface of the vertical wire means that the magnetic powder does not enter the inside of a main plane of the side surface of the vertical wire with respect to the main plane. Therefore, if the entire magnetic powder is located outside the plane, the magnetic powder does not enter the side surface of the vertical wire although the magnetic powder enters the conductive protection film.

Preferably, in an embodiment of the inductor component, a thickness of the conductive protection film is smaller than an equivalent circle diameter of the vertical wire in a section orthogonal to an extending direction of the vertical wire, and an electrical resistivity of the conductive protection film is larger than an electrical resistivity of the vertical wire.

According to the above embodiment, since the electrical resistivity of the conductive protection film is larger than the electrical resistivity of the vertical wire, the formation of the leak path can be further suppressed. In addition, since the thickness of the conductive protection film is relatively small, a proportion occupied by the vertical wire having a low electrical resistivity increases in a current path including the vertical wire and the conductive protection film. As a result, an increase in electric resistance in the current path can be suppressed.

Preferably, in an embodiment of the inductor component, the conductive protection film includes a plurality of layers.

According to the above embodiment, various characteristics such as close contact and stress of the conductive protection film can be appropriately adjusted.

Preferably, in an embodiment of the inductor component, each of the plurality of layers has a different hardness.

According to the above embodiment, various characteristics such as close contact and stress of the conductive protection film can be appropriately adjusted.

Preferably, in an embodiment of the inductor component, each of the plurality of layers has a different electrical resistivity.

According to the above embodiment, various characteristics such as close contact and stress of the conductive protection film can be appropriately adjusted.

Preferably, in an embodiment of the inductor component, the vertical wire and the conductive protection film are exposed to the first principal surface.

According to the above embodiment, since an exposed surface of the vertical wire is surrounded by the conductive protection film having a high hardness on the first principal surface, the vertical wire can be suppressed from extending along the first principal surface when the first principal surface is ground.

Preferably, in an embodiment of the inductor component, the inductor component further includes an external terminal provided on the first principal surface, and the external terminal is directly connected to at least a part of the vertical wire and the conductive protection film.

According to the above embodiment, the electric resistance between the external terminal and the vertical wire can be reduced.

Preferably, in an embodiment of the inductor component, the inductor component further includes a first insulating layer provided on the first principal surface.

According to the above embodiment, when there are a plurality of external terminals, a short circuit between the external terminals can be suppressed.

Preferably, in an embodiment of the inductor component, a surface shape of the conductive protection film is an uneven shape.

According to the above embodiment, the element body enters the irregularities of the conductive protection film, so that an anchor effect is generated, and the close contact between the conductive protection film and the element body can be secured.

Preferably, in an embodiment of the inductor component, the conductive protection film is further provided between the vertical wire and the inductor wire, and the vertical wire is electrically connected to the inductor wire with the conductive protection film interposed therebetween.

According to the above embodiment, since the conductive protection film can also be formed at the time of forming the vertical wire, the inductor component can be easily manufactured.

Preferably, in an embodiment of the inductor component, at least a part of the inductor wire is covered with a second insulating layer, and the conductive protection film is in contact with the element body and the second insulating layer.

According to the above embodiment, since the conductive protection film is in contact with the second insulating layer covering at least a part of the inductor wire, the close contact between the conductive protection film and the second insulating layer can be secured. In addition, since the conductive protection film is also in contact with the element body, a volume of the element body can be increased as compared with a case where the conductive protection film is not in contact with the element body, and inductance acquisition efficiency can be improved.

Preferably, in an embodiment of the inductor component, a wire length of the vertical wire is larger than a thickness of the inductor wire in a direction orthogonal to the first principal surface.

According to the above embodiment, the volume of the element body can be increased, and the inductance can be increased.

Preferably, in an embodiment of the inductor component, the inductor wire includes a plurality of inductor wires, and the plurality of inductor wires are disposed on the same plane parallel to the first principal surface and electrically separated from each other.

According to the above embodiment, an inductor array can be configured, and the inductance density can be increased.

Preferably, in an embodiment of the inductor component, the inductor wire extends along a plane parallel to the first principal surface, the inductor wire includes a plurality of inductor wires, and the plurality of inductor wires are disposed side by side in a direction orthogonal to the first principal surface and are electrically connected in series According to the above embodiment, the inductance can be increased.

Preferably, in an embodiment of the inductor component, the conductive protection film includes at least one of a Ti element, an Ni element, an Fe element, and a Cu element.

According to the above embodiment, when vertical wires are provided at both ends of the inductor wire or a plurality of inductor wires are provided, formation of a leak path between the vertical wires can be more effectively suppressed.

Preferably, in an embodiment of the inductor component, the vertical wire is made of the same material as the inductor wire and includes at least one of an Ag element and a Cu element.

According to the above embodiment, the electric resistance of the vertical wire can be reduced.

Preferably, in an embodiment of the inductor component, the conductive protection film has a higher hardness than the magnetic powder.

According to the above embodiment, it is possible to further suppress entry of the magnetic powder into the vertical wire.

Preferably, in an embodiment of the inductor component, the conductive protection film has a lower hardness than the magnetic powder.

According to the above embodiment, since the magnetic powder can enter the conductive protection film, the close contact between the conductive protection film and the element body can be improved by the anchor effect.

Preferably, in an embodiment of the inductor component, the plurality of magnetic powders include a magnetic powder having a higher hardness than the conductive protection film and a magnetic powder having a lower hardness than the conductive protection film.

According to the above embodiment, it is possible to suppress entry of the magnetic powder into the vertical wire and to improve the close contact between the conductive protection film and the element body.

According to an inductor component according to one aspect of the present disclosure, it is possible to suppress formation of a leak path between vertical wires.

DETAILED DESCRIPTION

Hereinafter, an inductor component which is one aspect of the present disclosure will be described in detail with reference to illustrated embodiments. Note that the drawings include some schematic drawings, and may not reflect actual dimensions or ratios.

First Embodiment (Configuration)

Figure 1:
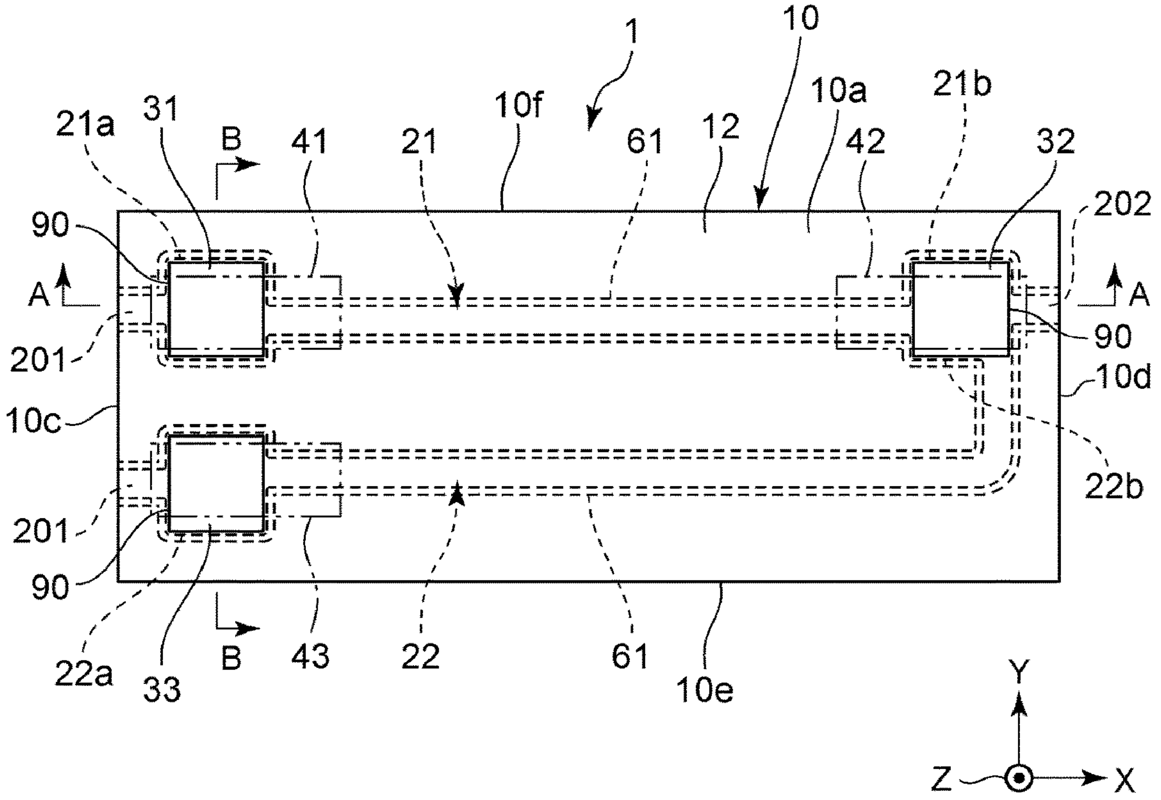
FIG. 1 is a plan view illustrating a first embodiment of an inductor component.
Figure 2A:
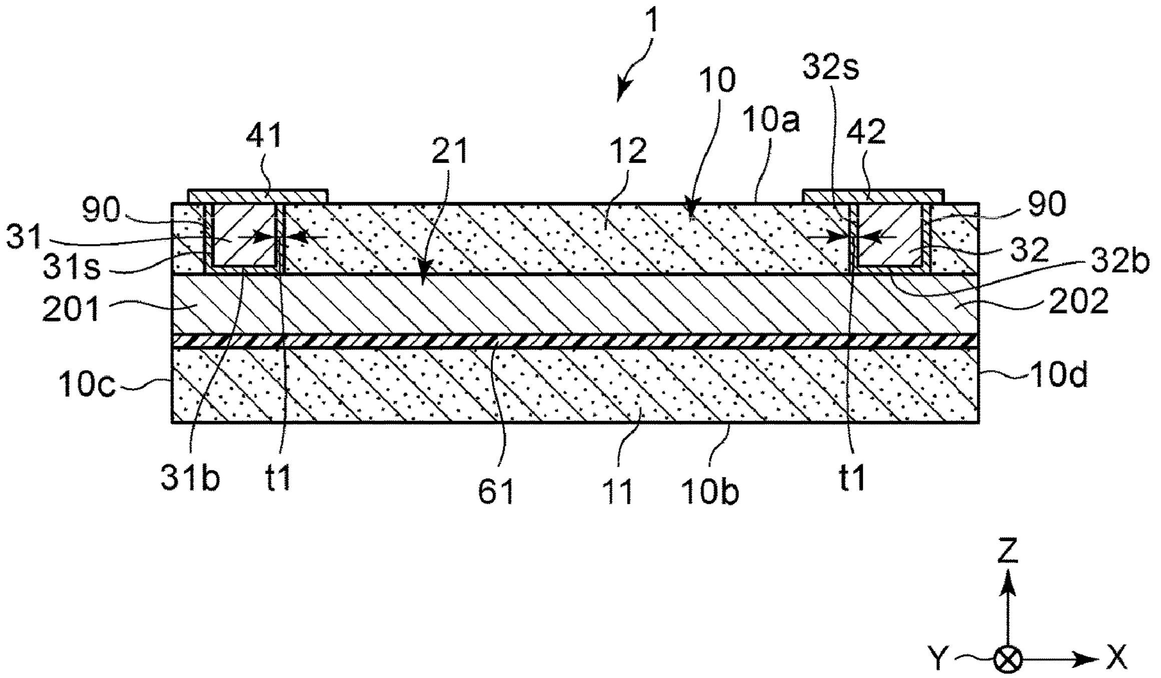
FIG. 2A is a sectional view taken along the line A-A of FIG. 1.
Figure 2B:
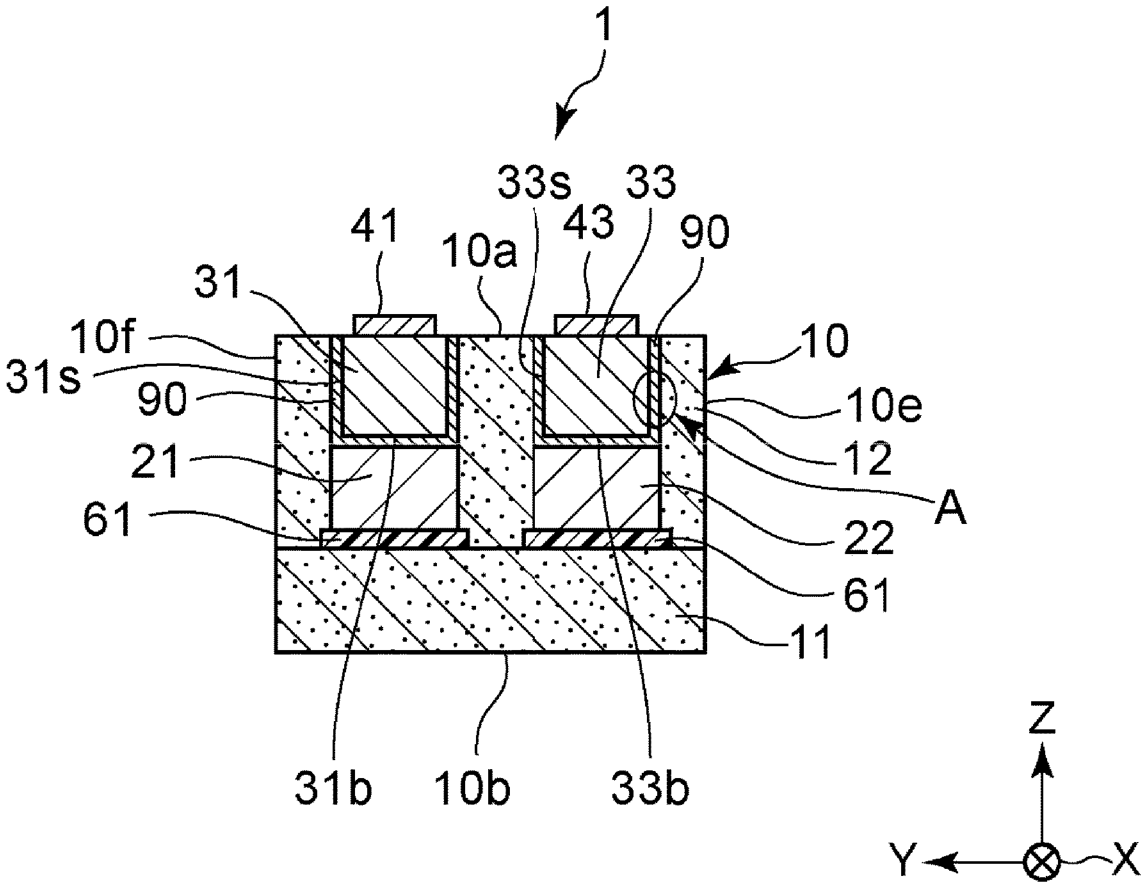
FIG. 2B is a sectional view taken along the line B-B of FIG. 1.

FIG. 1 is a plan view illustrating a first embodiment of an inductor component. FIG. 2A is a sectional view taken along the line A-A of FIG. 1. FIG. 2B is a sectional view taken along the line B-B in FIG. 1.

An inductor component 1 is mounted on an electronic device such as a personal computer, a DVD player, a digital camera, a TV, a mobile phone, or car electronics, and is, for example, a component having a rectangular parallelepiped shape as a whole. However, the shape of the inductor component 1 is not particularly limited, and may be a columnar shape, a polygonal columnar shape, a truncated cone shape, or a polygonal frustum shape.

As illustrated in FIGS. 1, 2A, and 2B, the inductor component 1 includes an element body 10, a first inductor wire 21 and a second inductor wire 22 provided in the element body 10, a first columnar wire 31, a second columnar wire 32, and a third columnar wire 33 provided in the element body 10 such that an end face is exposed from a first principal surface 10*a* of the element body 10, a conductive protection film 90 covering at least a part of a side surface of each columnar wire of the first to third columnar wires 31 to 33, and a first external terminal 41, a second external terminal 42, and a third external terminal 43 exposed on the first principal surface 10*a* of the element body 10. In FIG. 1, for convenience, the first to third external terminals 41 to 43 are indicated by two-dot chain lines.

In the drawings, a thickness direction of the inductor component 1 is defined as a Z direction, a forward Z direction is defined as an upper side, and a reverse Z direction is defined as a lower side. In a plane orthogonal to the Z direction of the inductor component 1, a length direction of the inductor component 1 is defined as an X direction, and a width direction of the inductor component 1 is defined as a Y direction.

The element body 10 has a first principal surface 10*a* and a second principal surface 10*b*, and a first side surface 10*c*, a second side surface 10*d*, a third side surface 10*e*, and a fourth side surface 10*f* that are located between the first principal surface 10*a* and the second principal surface 10*b* and connect the first principal surface 10*a* and the second principal surface 10*b*.

The first principal surface 10*a* and the second principal surface 10*b* are disposed opposite to each other in the Z direction, the first principal surface 10*a* is disposed in the forward Z direction, and the second principal surface 10*b* is disposed in the reverse Z direction. The first side surface 10*c* and the second side surface 10*d* are disposed opposite to each other in the X direction, the first side surface 10*c* is disposed in the reverse X direction, and the second side surface 10*d* is disposed in the forward X direction. The third side surface 10*e* and the fourth side surface 10*f* are disposed opposite to each other in the Y direction, the third side surface 10*e* is disposed in the reverse Y direction, and the fourth side surface 10*f* is disposed in the forward Y direction.

The element body 10 has a first magnetic layer 11 and a second magnetic layer 12 sequentially stacked along the forward Z direction. Each of the first magnetic layer 11 and the second magnetic layer 12 includes a plurality of magnetic powders and a resin containing the plurality of magnetic powders. The resin is, for example, an organic insulating material including an epoxy-based resin, a phenol-based resin, a liquid crystal polymer-based resin, a polyimide-based resin, an acrylic resin, or a mixture containing them. The magnetic powder is, for example, an FeSi-based alloy such as FeSiCr, an FeCo-based alloy, an Fe-based alloy such as NiFe, or an amorphous alloy thereof. Therefore, as compared with a magnetic layer made of ferrite, DC superposition characteristics can be improved by the magnetic powder, and magnetic powders are insulated from each other by the resin, so that a loss (iron loss) at a high frequency is reduced.

The first inductor wire 21 and the second inductor wire 22 are disposed between the first magnetic layer 11 and the second magnetic layer 12, and extend along a plane parallel to the first principal surface 10*a*. Specifically, the first magnetic layer 11 exists in the reverse Z direction of the first inductor wire 21 and the second inductor wire 22, and the second magnetic layer 12 exists in the direction orthogonal to the forward Z direction and the forward Z direction of the first inductor wire 21 and the second inductor wire 22.

The first inductor wire 21 extends linearly along the X direction when viewed from the Z direction. When the second inductor wire 22 is viewed from the Z direction, a part of the second inductor wire 22 extends linearly along the X direction, and the other part extends linearly along the Y direction, that is, the second inductor wire 22 extends in an L shape.

The thicknesses of the first and second inductor wires 21 and 22 are preferably, for example, 40 μm or more and 120 μm or less (i.e., from 40 μm to 120 μm). As examples of the first and second inductor wires 21 and 22, the thickness is 35 μm, the wire width is 50 μm, and the maximum space between the wires is 200 μm.

The first inductor wire 21 and the second inductor wire 22 are made of a conductive material, for example, a low electric resistance metal material such as Cu, Ag, Au, or Al. The first inductor wire 21 and the second inductor wire 22 may be wires including not only a single metal such as Cu or Ag but also an alloy containing a Cu element or an Ag element. In the present embodiment, the inductor component 1 includes only one layer of the first and second inductor wires 21 and 22, and the height of the inductor component 1 can be reduced. Note that the inductor wire may have a two-layer structure of a seed layer and an electrolytic plating layer, or may contain Ti or Ni as the seed layer.

A first end 21*a* of the first inductor wire 21 is electrically connected to the first columnar wire 31, and a second end 21*b* of the first inductor wire 21 is electrically connected to the second columnar wire 32. That is, the first inductor wire 21 has a pad portion having a large line width at the first and second ends 21*a* and 21*b*, and is directly connected to the first and second columnar wires 31 and 32 at the pad portions.

A first end 22*a* of the second inductor wire 22 is electrically connected to the third columnar wire 33, and a second end 22*b* of the second inductor wire 22 is electrically connected to the second columnar wire 32. That is, the second inductor wire 22 has a pad portion at the first end 22*a*, and is directly connected to the third columnar wire 33 at the pad portion. The second end 22*b* of the second inductor wire 22 is common to the second end 21*b* of the first inductor wire 21.

The first end 21*a* of the first inductor wire 21 and the first end 22*a* of the second inductor wire 22 are located on the side of the first side surface 10*c* of the element body 10 when viewed from the Z direction. The second end 21*b* of the first inductor wire 21 and the second end 22*b* of the second inductor wire 22 are located on the side of the second side surface 10*d* of the element body 10 when viewed from the Z direction.

A first extended wire 201 is connected to each of the first end 21*a* of the first inductor wire 21 and the first end 22*a* of the second inductor wire 22, and the first extended wire 201 is exposed from the first side surface 10*c*. A second extended wire 202 is connected to the second end 21*b* of the first inductor wire 21 and the second end 22*b* of the second inductor wire 22, and the second extended wire 202 is exposed from the second side surface 10*d*.

The first extended wire 201 and the second extended wire 202 are wires to be connected to a power supply wire when electrolytic plating is additionally performed after the shapes of the first and second inductor wires 21 and 22 are formed in the manufacturing process of the inductor component 1. In an inductor substrate state before the inductor component 1 is cut with the dicing machine by the power supply wire, electrolytic plating can be additionally easily performed, and the distance between the wires can be decreased. Further, by additionally performing electrolytic plating and decreasing the distance between the wires of the first and second inductor wires 21 and 22, magnetic coupling between the first and second inductor wires 21 and 22 can be enhanced. In addition, by providing the first extended wire 201 and the second extended wire 202, the strength can be secured at the time of cutting the element body 10 when the inductor component 1 is cut with the dicing machine, and the yield at the time of manufacturing can be improved.

The first to third columnar wires 31 to 33 extend in the Z direction from the inductor wires 21 and 22 and penetrate the inside of the second magnetic layer 12. The columnar wire corresponds to a "vertical wire" described in the claims.

The first columnar wire 31 extends from a top surface of the conductive protection film 90 provided on a top surface of the first end 21*a* of the first inductor wire 21 to the first principal surface 10*a* of the element body 10, and the end face of the first columnar wire 31 is exposed from the first principal surface 10*a* of the element body 10. The second columnar wire 32 extends from the top surface of the conductive protection film 90 provided on a top surface of the second end 21*b* of the first inductor wire 21 to the first principal surface 10*a* of the element body 10, and the end face of the second columnar wire 32 is exposed from the first principal surface 10*a* of the element body 10. The third columnar wire 33 extends from the top surface of the conductive protection film 90 provided on a top surface of the first end 22*a* of the second inductor wire 22 to the first principal surface 10*a* of the element body 10, and the end face of the third columnar wire 33 is exposed from the first principal surface 10*a* of the element body 10. "The end face of the columnar wire is exposed from the first principal surface of the element body" includes not only a case where the entire end face of the columnar wire is exposed to the outside of the inductor component 1 but also a case where a part or an entire portion of the end face of the columnar wire is covered with an external terminal or the like.

Therefore, the first columnar wire 31, the second columnar wire 32, and the third columnar wire 33 linearly extend in a direction orthogonal to the first principal surface 10*a* from the first inductor wire 21 and the second inductor wire 22 to the end face exposed from the first principal surface 10*a*. As a result, the first external terminal 41, the second external terminal 42, and the third external terminal 43 can be connected to the first inductor wire 21 and the second inductor wire 22 at a shorter distance, and a decrease in resistance or an increase in inductance of the inductor component 1 can be realized. The first to third columnar wires 31 to 33 are made of a conductive material. The first to third columnar wires 31 to 33 are made of the same material as the inductor wires 21 and 22, and preferably include at least one of an Ag element and a Cu element. As a result, the electric resistance of the first to third columnar wires 31 to 33 can be further reduced. The conductive material may be a conductive paste, for example, an Ag paste.

Note that, when the first and second inductor wires 21 and 22 are covered with an insulating layer made of a non-magnetic material, the first to third columnar wires 31 to 33 may be electrically connected to the first and second inductor wires 21 and 22 with a via wire penetrating the insulating layer interposed therebetween. The via wire is a conductor having a line width (a diameter and a sectional area) smaller than that of the columnar wire. In this case, the "vertical wire" described in the claims includes the via wire and the columnar wire. Further, in this case, the conductive protection film may be formed at a position covering the side surface and the bottom surface of the via wire, or may not be formed around the via wire.

The conductive protection film 90 protects the first to third columnar wires 31 to 33 from the magnetic powder of the second magnetic layer 12. The conductive protection film 90 has a higher hardness than the first to third columnar wires 31 to 33. The "hardness" described in the present specification can be calculated by Vickers hardness measurement. However, when it is difficult to measure the Vickers hardness, for example, an evaluation target may be subjected to elemental analysis by energy dispersive X-ray spectroscopy (EDX) or the like, and "hardness" may be set with reference to hardness data of a bulk metal of a metal element that has been found. The "conductive" in the conductive protection film means that the electrical resistivity is $10^{-6}$ Ω·m or less.

The conductive protection film 90 includes, for example, at least one of a Ti element, an Ni element, an Fe element, and a Cu element. Ti is excellent in the close contact with an organic resin, and has a higher hardness than Cu and Ag used for the conductive materials of the inductor wires 21 and 22. Ni also has a higher hardness than Cu and Ag. Since Ni is a magnetic metal, the inductance of the inductor component 1 can be improved when the conductive protection film 90 includes Ni. Fe and Cu have high affinity with the magnetic material and the first to third columnar wires 31 to 33. The conductive protection film 90 is particularly preferably made of Ti. As a result, when Ti is adopted as the seed layer, the conductive protection film 90 can be formed of the same material as the seed layer, so that the inductor component 1 can be easily manufactured. The conductive protection film 90 may be a single layer or a plurality of layers.

The conductive protection film 90 covers the side surface and the bottom surface of each of the first to third columnar wires 31 to 33. Specifically, the conductive protection film 90 covers a side surface 31*s* and a bottom surface 31*b* of the first columnar wire 31, a side surface 32*s* and a bottom surface 32*b* of the second columnar wire 32, and a side surface 33*s* and a bottom surface 33*b* of the third columnar wire 33. The side surface 31*s*, the side surface 32*s*, and the side surface 33*s* extend along a direction (Z direction) orthogonal to the first principal surface 10*a*. The conductive protection film 90 covering the side surface 31*s* of the first columnar wire 31 is exposed to the first principal surface 10*a*. The conductive protection film 90 covering the side surface 31*s* of the first columnar wire 31 is in contact with the second magnetic layer 12. The conductive protection film 90 covering the bottom surface 31*b* of the first columnar wire 31 is in contact with the top surface of the first end 21*a* of the first inductor wire 21. In other words, the conductive protection film 90 covering the bottom surface 31*b* of the first columnar wire 31 is provided between the first columnar wire 31 and the first inductor wire 21, and electrically connects the first columnar wire 31 and the first inductor wire 21. As a result, since the conductive protection film 90 can also be formed at the time of forming the first columnar wire 31, the inductor component 1 can be easily manufactured.

Similarly, the conductive protection film 90 covering the side surface 32*s* of the second columnar wire 32 is exposed to the first principal surface 10*a*. The conductive protection film 90 covering the side surface 32*s* of the second columnar wire 32 is in contact with the second magnetic layer 12. The conductive protection film 90 covering the bottom surface 32*b* of the second columnar wire 32 is in contact with the top surface of the second end 21*b* of the first inductor wire 21. In other words, the conductive protection film 90 covering the bottom surface 32*b* of the second columnar wire 32 is provided between the second columnar wire 32 and the first inductor wire 21, and electrically connects the second columnar wire 32 and the first inductor wire 21. As a result, since the conductive protection film 90 can also be formed at the time of forming the second columnar wire 32, the inductor component 1 can be easily manufactured. In addition, the conductive protection film 90 covering the side surface 33*s* of the third columnar wire 33 is exposed to the first principal surface 10*a*. The conductive protection film 90 covering the side surface 33*s* of the third columnar wire 33 is in contact with the second magnetic layer 12. The conductive protection film 90 covering the bottom surface 33*b* of the third columnar wire 33 is in contact with the top surface of the first end 22*a* of the second inductor wire 22. In other words, the conductive protection film 90 covering the bottom surface 33*b* of the third columnar wire 33 is provided between the third columnar wire 33 and the first inductor wire 21, and electrically connects the third columnar wire 33 and the second inductor wire 22. As a result, since the conductive protection film 90 can also be formed at the time of forming the third columnar wire 33, the inductor component 1 can be easily manufactured.

The first to third external terminals 41 to 43 are provided on the first principal surface 10*a* of the element body 10. The first to third external terminals 41 to 43 are made of a conductive material, and have a three-layer structure in which, for example, Cu having low electric resistance and excellent stress resistance, Ni having excellent corrosion resistance, and Au having excellent solder wettability and reliability are arranged in this order from the inside to the outside.

The first external terminal 41 is in contact with the end face of the first columnar wire 31 exposed from the first principal surface 10*a* of the element body 10 and is electrically connected to the first columnar wire 31. As a result, the first external terminal 41 is electrically connected to the first end 21*a* of the first inductor wire 21. The second external terminal 42 is in contact with the end face of the second columnar wire 32 exposed from the first principal surface 10*a* of the element body 10 and is electrically connected to the second columnar wire 32. As a result, the second external terminal 42 is electrically connected to the second end 21*b* of the first inductor wire 21 and the second end 22*b* of the second inductor wire 22. The third external terminal 43 is in contact with the end face of the third columnar wire 33, is electrically connected to the third columnar wire 33, and is electrically connected to the first end 22*a* of the second inductor wire 22.

Each of a bottom surface of the first inductor wire 21 and a bottom surface of the second inductor wire 22 is covered with an insulating layer 61. The insulating layer 61 is made of an insulating material including no magnetic body, and is made of a resin material such as an epoxy-based resin, a phenol-based resin, or a polyimide-based resin. As described above, at least a part of the inductor wires 21 and 22 is covered with the insulating layer 61, so that an insulating property between the inductor wires 21 and 22 and the first magnetic layer 11 can be secured. Note that the insulating layer 61 may contain a non-magnetic filler such as silica, and in this case, the strength, processability, and electrical characteristics of the insulating layer 61 can be improved. The insulating layer 61 corresponds to a "second insulating layer" described in the claims.

Figure 3:
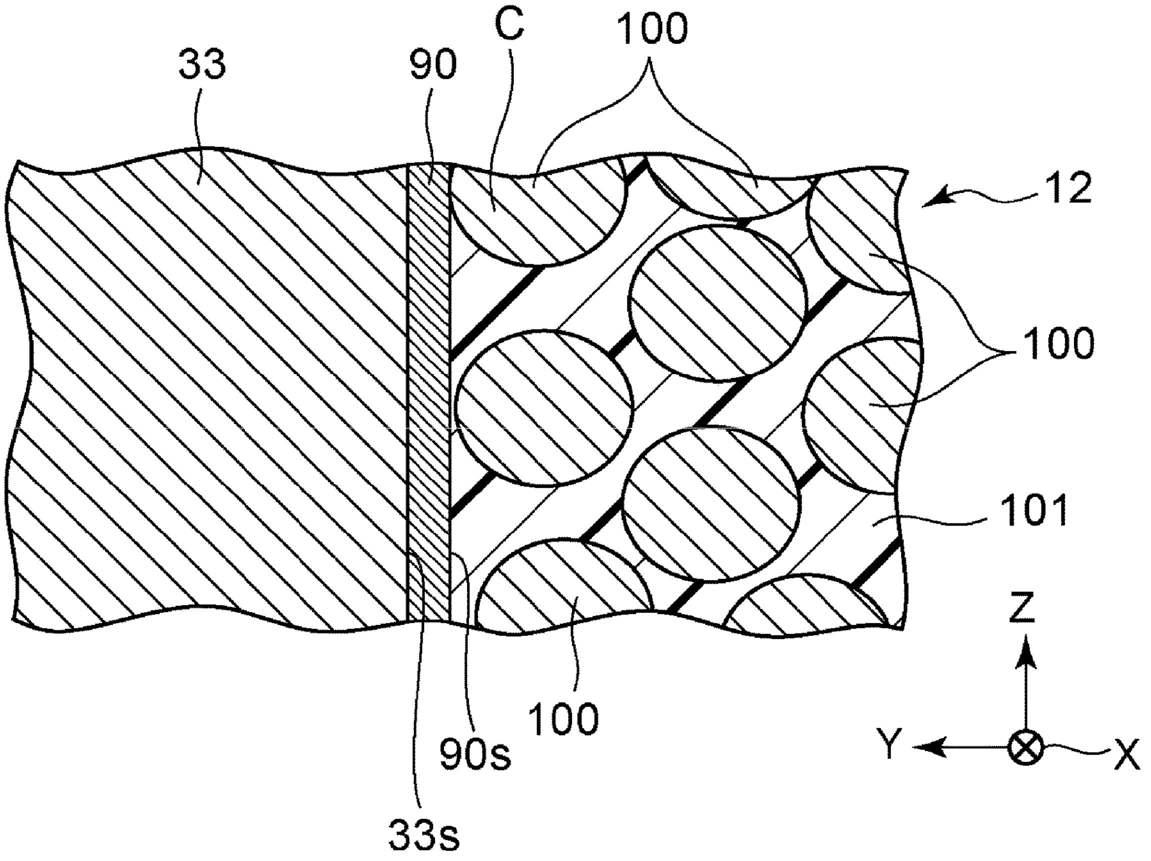
FIG. 3 is an enlarged view of a portion A in FIG. 2B.

FIG. 3 is an enlarged view of a portion A in FIG. 2B. As illustrated in FIG. 3, the second magnetic layer 12 includes a plurality of magnetic powders 100 and a resin 101 containing the plurality of magnetic powders 100. At least one magnetic powder 100 contains an Fe element as a main component. The fact that the magnetic powder 100 contains the Fe element as the main component means that the magnetic powder 100 is made of a simple substance of Fe or an Fe-based alloy in which Fe has the largest element amount among the element amounts, and is, for example, a metal magnetic powder such as FeSi, FeSiCr, FeSiAl, or FeNi. Note that the magnetic powder 100 may have an amorphous structure or a crystal structure. In addition, the plurality of magnetic powders 100 may include a magnetic powder not containing an Fe element as a main component.

The side surface 33*s* of the third columnar wire 33 is covered with the conductive protection film 90. In the conductive protection film 90, a surface 90*s* opposite to the side surface 33*s* of the third columnar wire 33 is in contact with the second magnetic layer 12. In the present embodiment, the surface 90*s* of the conductive protection film 90 is in contact with at least one (magnetic powder indicated by a reference sign C in FIG. 3) of the plurality of magnetic powders 100. In addition, the magnetic powder 100 in contact is in contact without entering the side surface 33*s* of the third columnar wire 33. As a result, a conduction path between the third columnar wire 33 and the magnetic powder 100 can be reduced, and the formation of a leak path between the third columnar wire 33 and the other columnar wires 31 and 32 can be suppressed. Although the third columnar wire 33 has been described as an example, the same is applied to the first columnar wire 31 and the second columnar wire 32.

Here, "the magnetic powder does not enter the side surface of the columnar wire (vertical wire)" means that the magnetic powder does not enter the inside of the main plane of the side surface of the columnar wire with respect to the main plane. Therefore, when the entire magnetic powder is located outside the plane, the magnetic powder does not enter the side surface of the columnar wire although the magnetic powder enters the conductive protection film. On the other hand, "the magnetic powder enters the side surface of the columnar wire (vertical wire)" means that a recess exists on the side surface of the columnar wire, and at least a part of the magnetic powder corresponding to the recess enters inside the plane.

According to the inductor component 1, the side surfaces 31*s* to 33*s* of the first to third columnar wires 31 to 33 are covered with the conductive protection film 90 having a higher hardness than the first to third columnar wires 31 to 33. For this reason, entry of the conductive protection film 90 and the magnetic powder 100 into the first to third columnar wires 31 to 33 can be reduced. Therefore, it is possible to reduce the contact area between the conductive protection film 90 and the magnetic powder 100 while reducing the contact area between the first to third columnar wires 31 to 33 and the conductive protection film 90 at the entry portion, and the conduction path between the first to third columnar wires 31 to 33 and the magnetic powder 100 can be reduced. As a result, it is possible to suppress formation of a leak path between the respective columnar wires of the first to third columnar wires 31 to 33.

In addition, since the leak path formation can be suppressed by the conductive protection film 90, the filling amount of the second magnetic layer 12 can be made larger than before, and the inductance of the inductor component 1 can be improved.

In addition, since the plurality of inductor wires 21 and 22 are arranged on the same plane parallel to the first principal surface 10*a* and electrically separated from each other, it is possible to constitute an inductor array and increase the density of inductance.

The end faces of the first to third columnar wires 31 to 33 are exposed from the first principal surface 10*a* of the element body 10, and the conductive protection film 90 covering the side surfaces of the first to third columnar wires 31 to 33 is also exposed to the first principal surface 10*a*. As a result, the exposed surfaces of the first to third columnar wires 31 to 33 are surrounded by the conductive protection film 90 having a high hardness on the first principal surface 10*a*, so that it is possible to suppress the first to third columnar wires 31 to 33 from extending along the first principal surface 10*a* when the first principal surface 10*a* is ground. Although the end faces of the first to third columnar wires 31 to 33 and the conductive protection film 90 are exposed to the first principal surface 10*a*, it is not essential that they are exposed to the outside of the inductor component 1. That is, as in the present embodiment, the end faces of the first to third columnar wires 31 to 33 and the conductive protection film 90 may be covered with the first to third external terminals 41 to 43.

In addition, since the conductive protection film 90 is conductive, the inductance can be secured without reducing the inductance acquisition efficiency as compared with a case where an insulating film is provided on the side surfaces of the first to third columnar wires 31 to 33.

Preferably, the first external terminal 41 is directly connected to at least a part of the first columnar wire 31 and the conductive protection film 90. The second external terminal 42 is directly connected to at least a part of the second columnar wire 32 and the conductive protection film 90. The third external terminal 43 is directly connected to at least a part of the third columnar wire 33 and the conductive protection film 90. According to this configuration, the electric resistance between the first to third external terminals 41 to 43 and the first to third columnar wires 31 to 33 can be reduced.

Preferably, in a section (that is, a section parallel to the XY plane) orthogonal to the extending direction of the first to third columnar wires 31 to 33, the thickness (t1 illustrated in FIG. 2A) of the conductive protection film 90 is smaller than the equivalent circle diameter of each columnar wire of the first to third columnar wires 31 to 33, and the electrical resistivity of the conductive protection film 90 is larger than the electrical resistivity of the first to third columnar wires 31 to 33. The thickness of the conductive protection film 90 is, for example, 1 μm or less. According to this configuration, since the electrical resistivity of the conductive protection film 90 is larger than the electrical resistivity of the first to third columnar wires 31 to 33, the formation of the leak path can be further suppressed. In addition, since the thickness of the conductive protection film 90 is relatively small, a proportion occupied by the first columnar wire 31 having a low electrical resistivity increases in the current path including the first columnar wire 31 and the conductive protection film 90. As a result, an increase in electric resistance in the current path can be suppressed. The same is applied to the second columnar wire 32 and the third columnar wire 33.

Preferably, in the section orthogonal to the extending direction of the first to third columnar wires 31 to 33, the thickness of the conductive protection film 90 is 1/10 or less of the equivalent circle diameter of each columnar wire of the first to third columnar wires 31 to 33. According to this configuration, it is possible to further suppress an increase in electric resistance of the conductive protection film 90.

Preferably, the conductive protection film 90 has a higher hardness than the magnetic powder 100. According to this configuration, entry of the magnetic powder 100 into the first to third columnar wires 31 to 33 can be further suppressed.

Preferably, the conductive protection film 90 has a lower hardness than the magnetic powder 100. According to this configuration, since the magnetic powder 100 can enter the conductive protection film 90, the close contact between the conductive protection film 90 and the second magnetic layer 12 can be improved by the anchor effect.

Preferably, the plurality of magnetic powder 100 include a magnetic powder 100 having a higher hardness than the conductive protection film 90 and a magnetic powder 100 having a lower hardness than the conductive protection film 90. According to this configuration, it is possible to suppress entry of the magnetic powder 100 into the first to third columnar wires 31 to 33 and to improve the close contact between the conductive protection film 90 and the second magnetic layer 12.

(Manufacturing Method)

Next, a method for manufacturing the inductor component 1 will be described. FIGS. 4A to 4I correspond to a section (FIG. 2B) taken along the line B-B of FIG. 1.

Figure 4A:
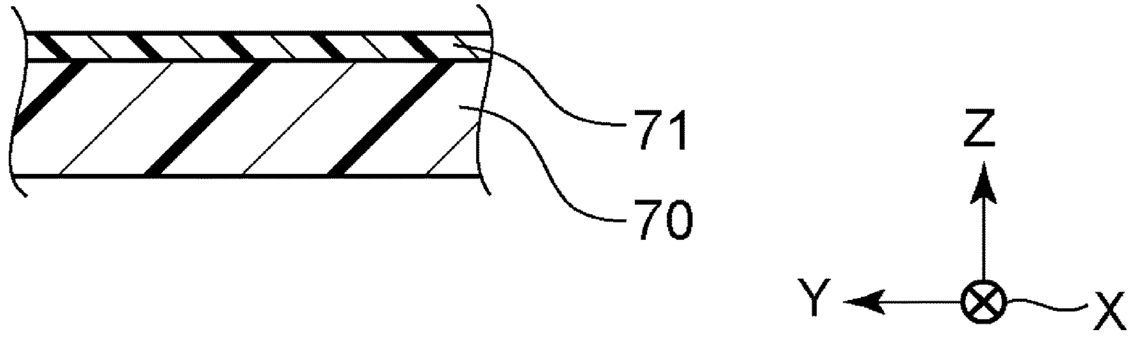
FIG. 4A is an explanatory diagram illustrating a manufacturing method of the inductor component.

As illustrated in FIG. 4A, a base substrate 70 is prepared. The base substrate 70 is made of, for example, an inorganic material such as ceramic, glass, or silicon. A base insulating layer 71 is applied onto the principal surface of the base substrate 70 to solidify the base insulating layer 71.

Figure 4B:
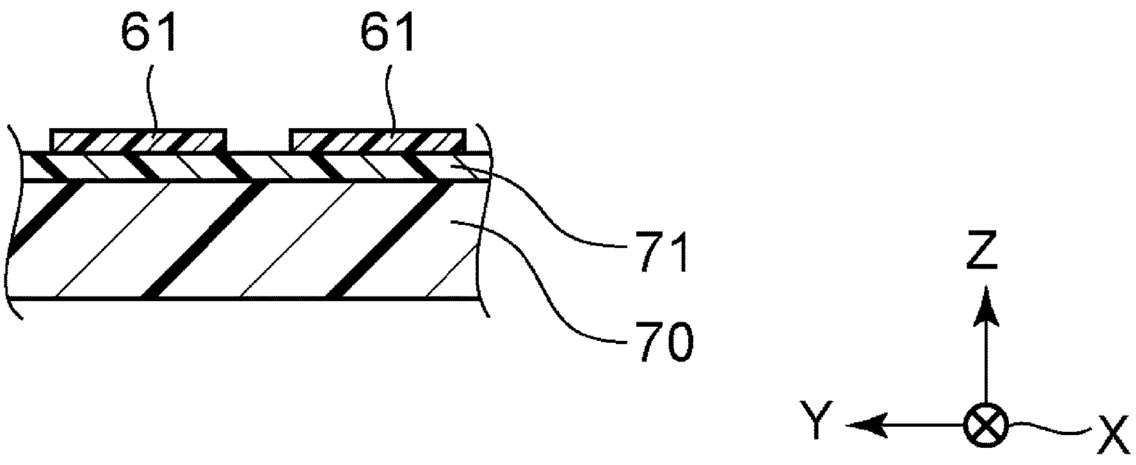
FIG. 4B is an explanatory diagram illustrating a manufacturing method of the inductor component.

As illustrated in FIG. 4B, a second insulating layer 61 is applied onto the base insulating layer 71, and a predetermined pattern is formed using a photolithography method and solidified.

Figure 4C:
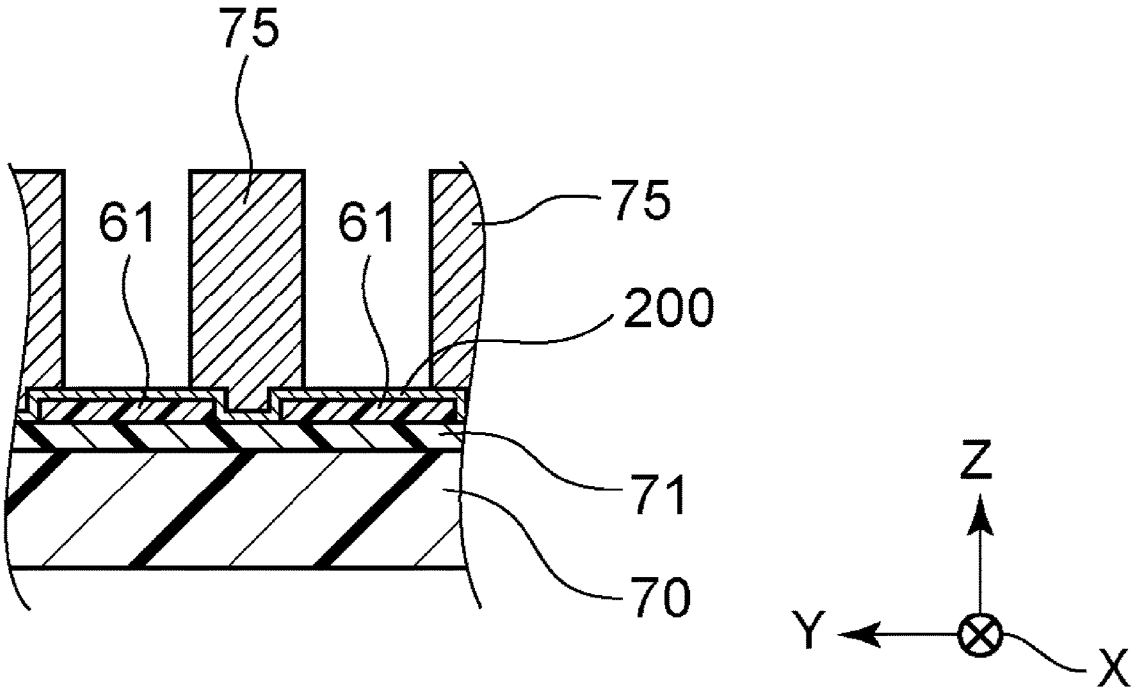
FIG. 4C is an explanatory diagram illustrating a manufacturing method of the inductor component.

As illustrated in FIG. 4C, a seed layer 200 is formed on the base insulating layer 71 and the second insulating layer 61 by a known method such as a sputtering method or a vapor deposition method. Thereafter, a dry film resist (DFR) 75 is attached, and a predetermined pattern is formed on the DFR 75 using a photolithography method. The predetermined pattern is a through hole corresponding to a position where the first inductor wire 21 and the second inductor wire 22 are provided on the second insulating layer 61.

Figure 4D:
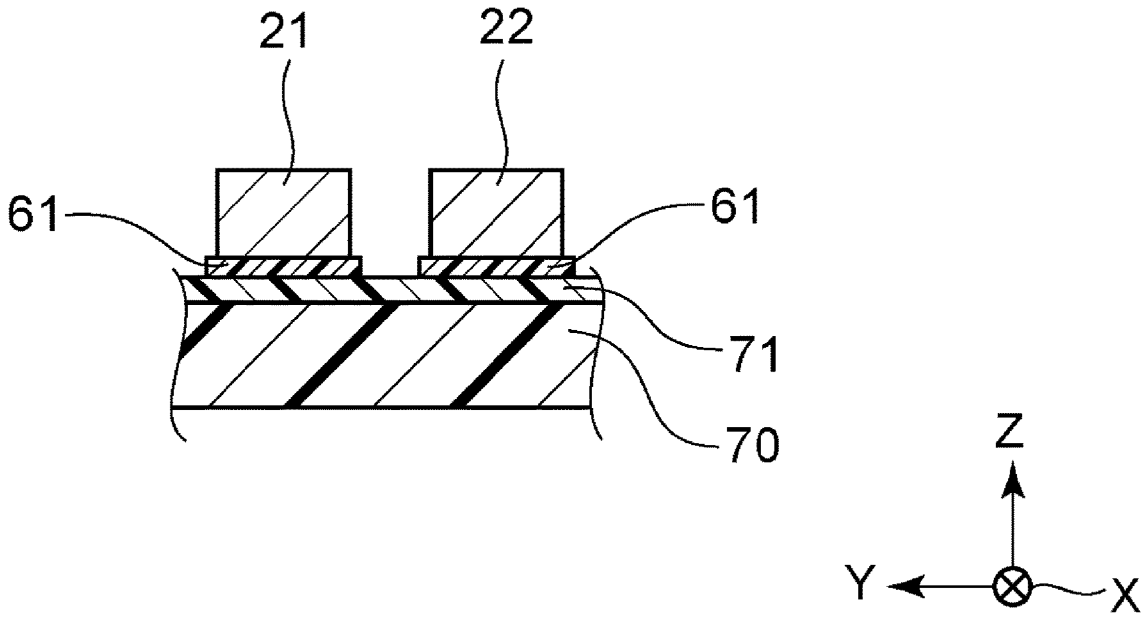
FIG. 4D is an explanatory diagram illustrating a manufacturing method of the inductor component.

As illustrated in FIG. 4D, while power is supplied to the seed layer 200, the first inductor wire 21 and the second inductor wire 22 are formed on the second insulating layer 61 using an electrolytic plating method. Thereafter, the DFR 75 is peeled off, and the seed layer 200 is etched. In this way, the first inductor wire 21 and the second inductor wire 22 are formed on the principal surface of the base substrate 70. Note that, in FIGS. 4D to 4I, the description of the seed layer 200 is omitted for convenience.

Figure 4E:
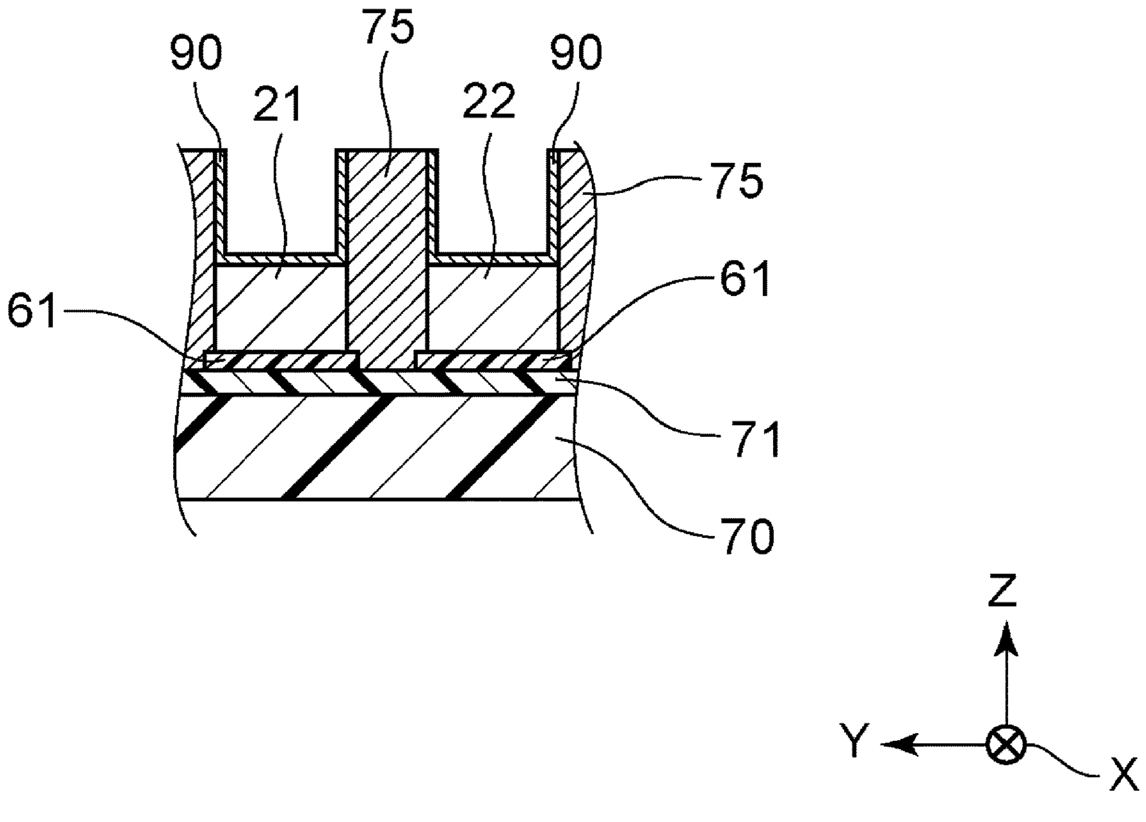
FIG. 4E is an explanatory diagram illustrating a manufacturing method of the inductor component.

As illustrated in FIG. 4E, the DFR 75 is attached again, and a predetermined pattern is formed on the DFR 75 using a photolithography method. The predetermined pattern is a through hole corresponding to a position where the first columnar wire 31, the second columnar wire 32, and the third columnar wire 33 on the first inductor wire 21 and the second inductor wire 22, and the conductive protection film 90 are provided. Thereafter, the conductive protection film 90 is formed on an inner surface of the through hole by a sputtering method. At this time, a mask is used such that the conductive protection film 90 is not formed on a portion other than the inner surface of the through hole. The mask is, for example, a shielding plate having a cavity at a position corresponding to the through hole.

Figure 4F:
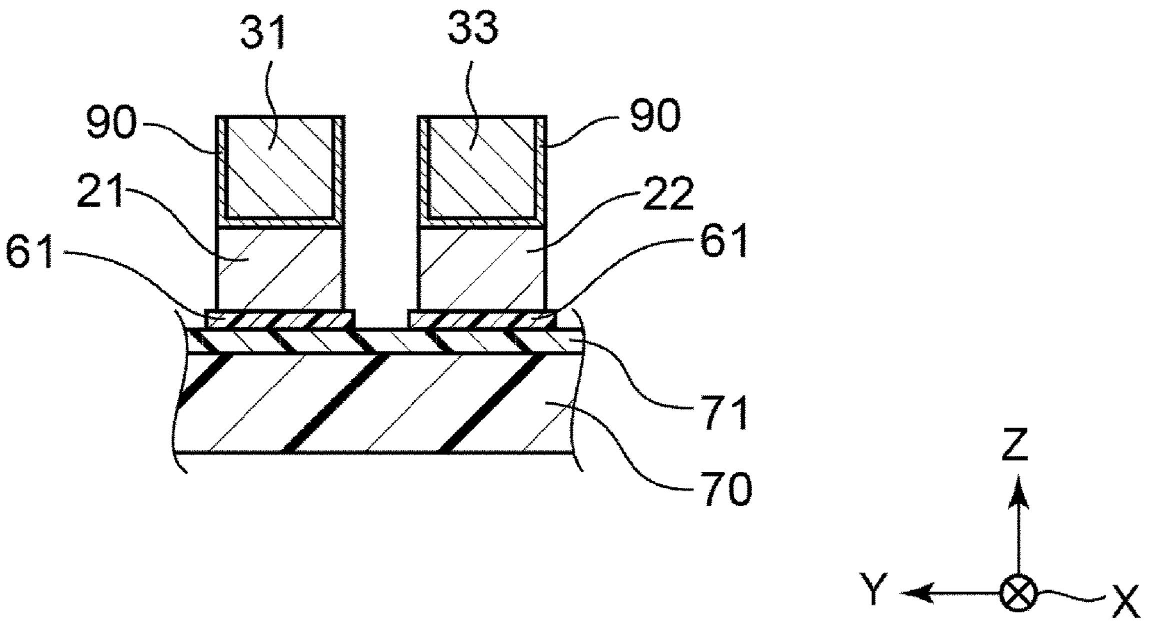
FIG. 4F is an explanatory diagram illustrating a manufacturing method of the inductor component.

As illustrated in FIG. 4F, the first columnar wire 31, the second columnar wire 32, and the third columnar wire 33 are formed on the first inductor wire 21 and the second inductor wire 22 using electrolytic plating. At this time, power is supplied from the first inductor wire 21 and the second inductor wire 22. Thereafter, the DFR 75 is peeled off. As a result, the first to third columnar wires 31 to 33 in which the side surfaces 31*s* to 33*s* and the bottom surfaces 31*b* to 33*b* are covered with the conductive protection film 90 are formed. For example, the conductive protection film 90 may be formed on the DFR 75 and the entire inner surface of the through hole by a sputtering method, and the first to third columnar wires 31 to 33 may be formed by plating using the conductive protection film 90 as a seed layer. At this time, since a conductor is also formed on the DFR 75 by plating, it is preferable to remove an unnecessary conductor by CMP, grinding, or the like.

Figure 4G:
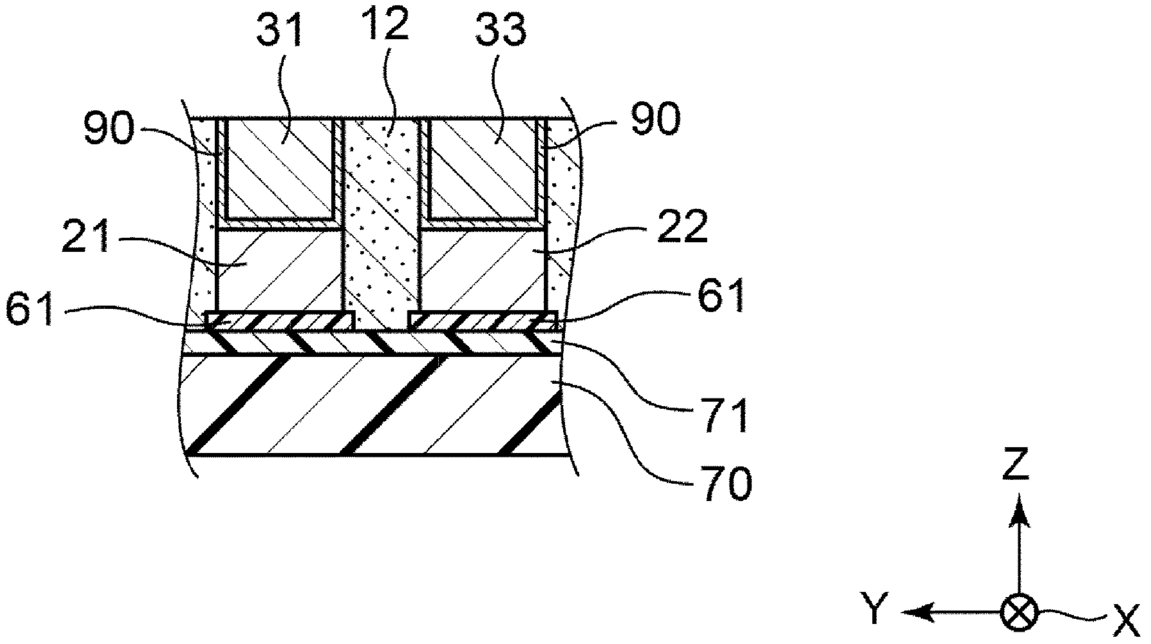
FIG. 4G is an explanatory diagram illustrating a manufacturing method of the inductor component.

As illustrated in FIG. 4G, a magnetic sheet to be the second magnetic layer 12 is pressure-bonded from above the principal surface of the base substrate 70 toward the first inductor wire 21 and the second inductor wire 22, and the first inductor wire 21 and the second inductor wire 22, the first columnar wire 31, the second columnar wire 32, and the third columnar wire 33, and the conductive protection film 90 are covered with the second magnetic layer 12. Thereafter, the top surface of the second magnetic layer 12 is ground, and the end faces of the first columnar wire 31, the second columnar wire 32, and the third columnar wire 33, and the conductive protection film 90 are exposed from the top surface of the second magnetic layer 12. In order to reduce deterioration of the magnetic powder due to an environmental load, a surface protection film made of an inorganic material such as glass or silicon, a resin, or the like may be used.

Figure 4H:
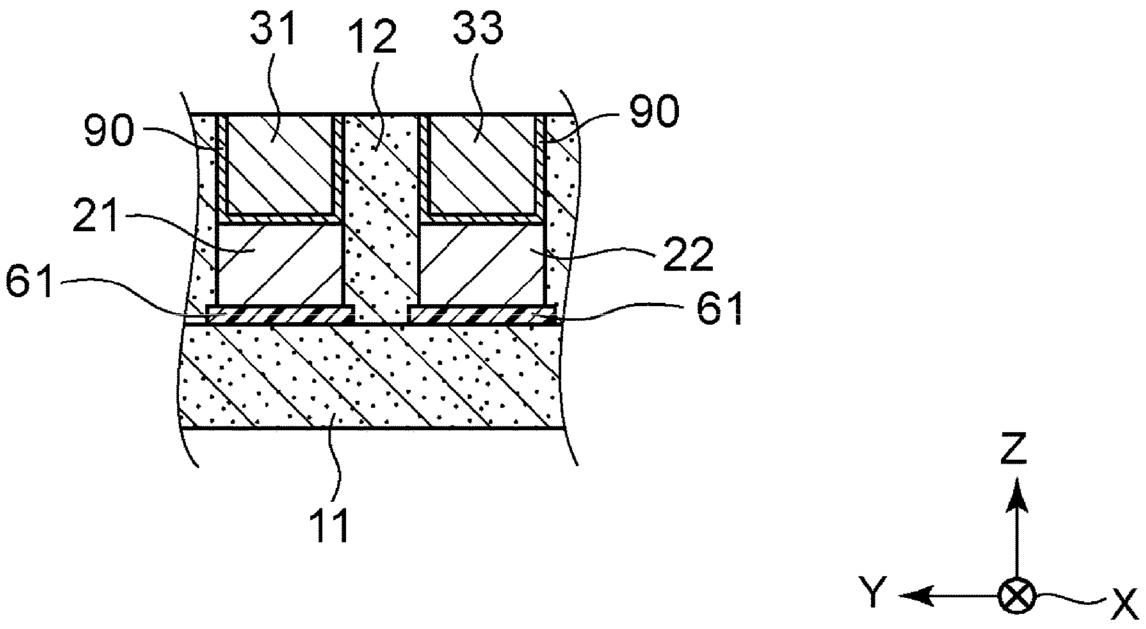
FIG. 4H is an explanatory diagram illustrating a manufacturing method of the inductor component.

As illustrated in FIG. 4H, the base substrate 70 and the base insulating layer 71 are removed by polishing. At this time, the base insulating layer 71 may be used as a peeling layer, and the base substrate 70 and the base insulating layer 71 may be removed by peeling. Thereafter, another magnetic sheet to be the first magnetic layer 11 is pressure-bonded from below the first inductor wire 21 and the second inductor wire 22 toward the first inductor wire 21 and the second inductor wire 22, and the first inductor wire 21 and the second inductor wire 22 are covered with the first magnetic layer 11. Thereafter, the first magnetic layer 11 is ground to a predetermined thickness.

Figure 4I:
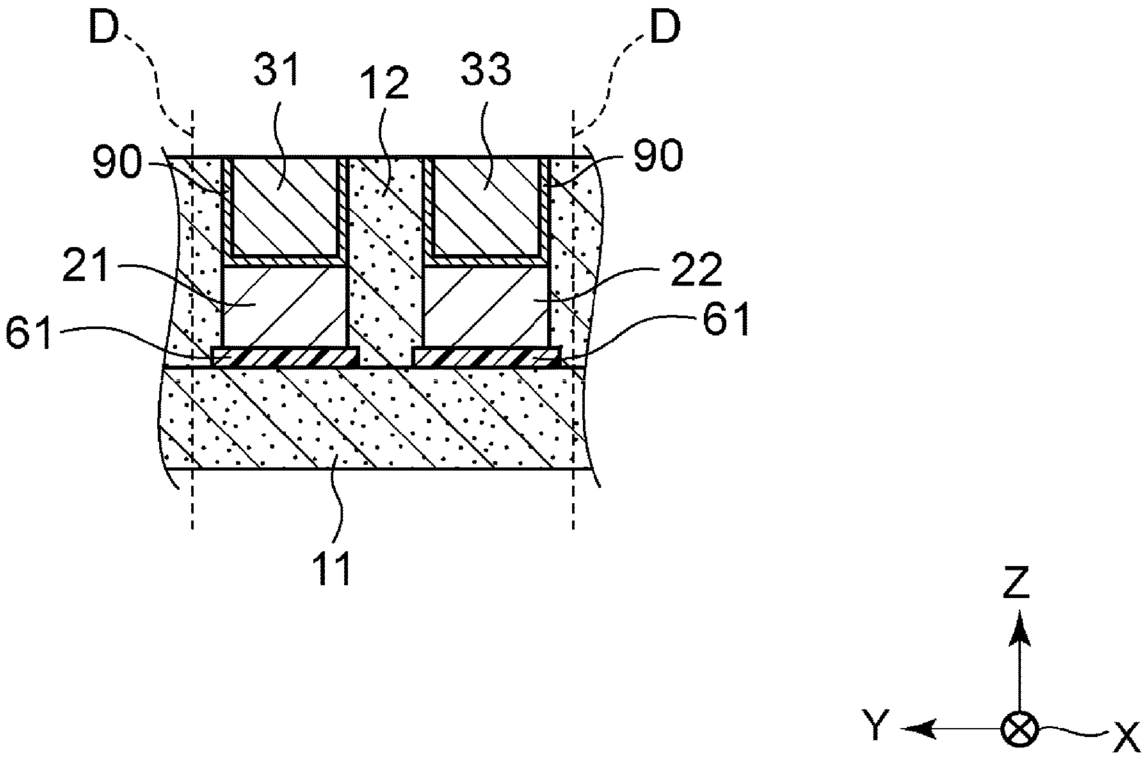
FIG. 4I is an explanatory diagram illustrating a manufacturing method of the inductor component.

As illustrated in FIG. 4I, the inductor component 1 is cut with the dicing machine along a cutting line D. Thereafter, a metal film is formed on the first to third columnar wires 31 to 33 by electroless plating to form the first external terminal 41, the second external terminal 42, and the third external terminal 43. As a result, as illustrated in FIG. 2B, the inductor component 1 is manufactured.

(Modification)

Figure 5:
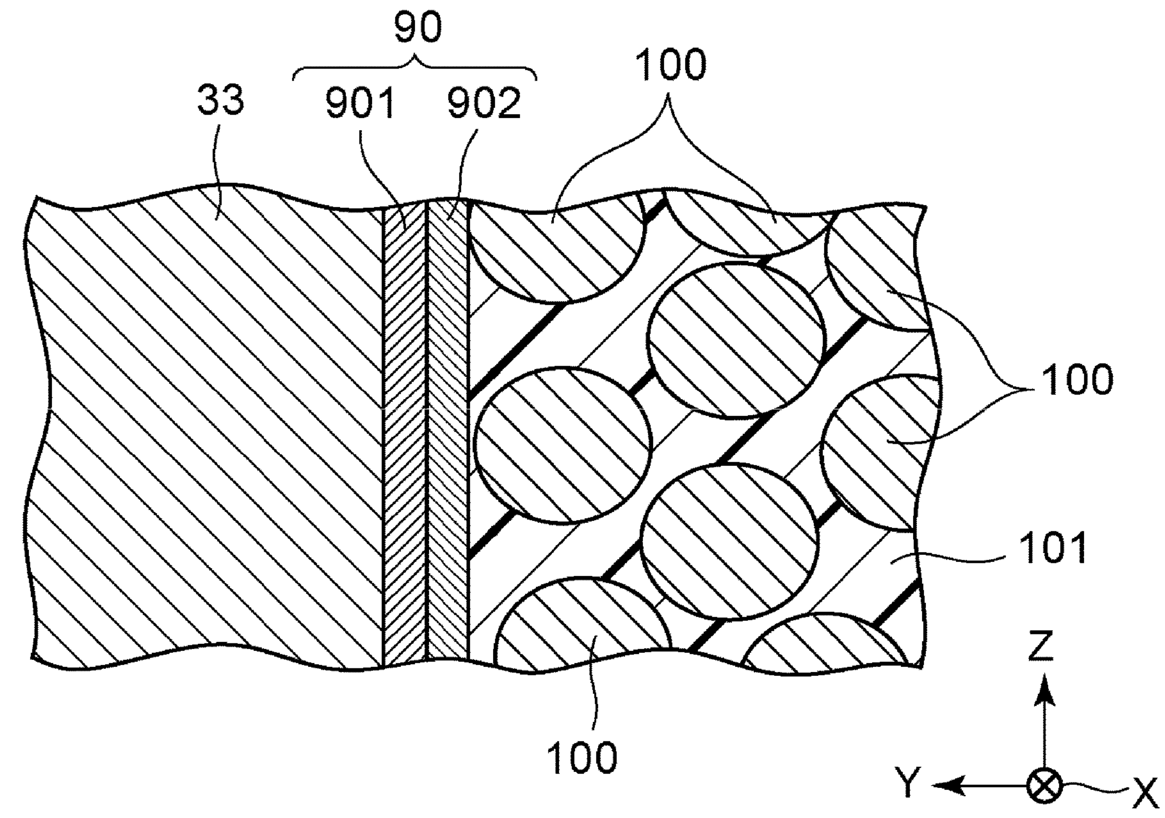
FIG. 5 is a schematic sectional view illustrating a modification of the inductor component.

FIG. 5 is a schematic sectional view of an inductor component according to a modification. FIG. 5 is a sectional view corresponding to FIG. 3. As illustrated in FIG. 5, the conductive protection film 90 may include a plurality of layers. Specifically, the conductive protection film 90 may include a first layer 901 and a second layer 902 sequentially from the side of the third columnar wire 33. For example, the first layer 901 is a Ti layer, and the second layer 902 is a Cu layer. The number of layers of the conductive protection film 90 may be three or more. According to the above configuration, various characteristics such as close contact and stress of the conductive protection film 90 can be appropriately adjusted. Note that the same is applied to the conductive protection film 90 covering the side surfaces of the first columnar wire 31 and the second columnar wire 32.

Preferably, each layer of the conductive protection film 90 has a different hardness. When the hardness of the metal becomes low, the close contact becomes high. Therefore, according to the above configuration, the close contact of the conductive protection film 90 can be appropriately adjusted.

Preferably, each layer of the conductive protection film 90 has a different electrical resistivity. According to the above configuration, various characteristics such as close contact and stress of the conductive protection film 90 can be appropriately adjusted.

Second Embodiment

Figure 6:
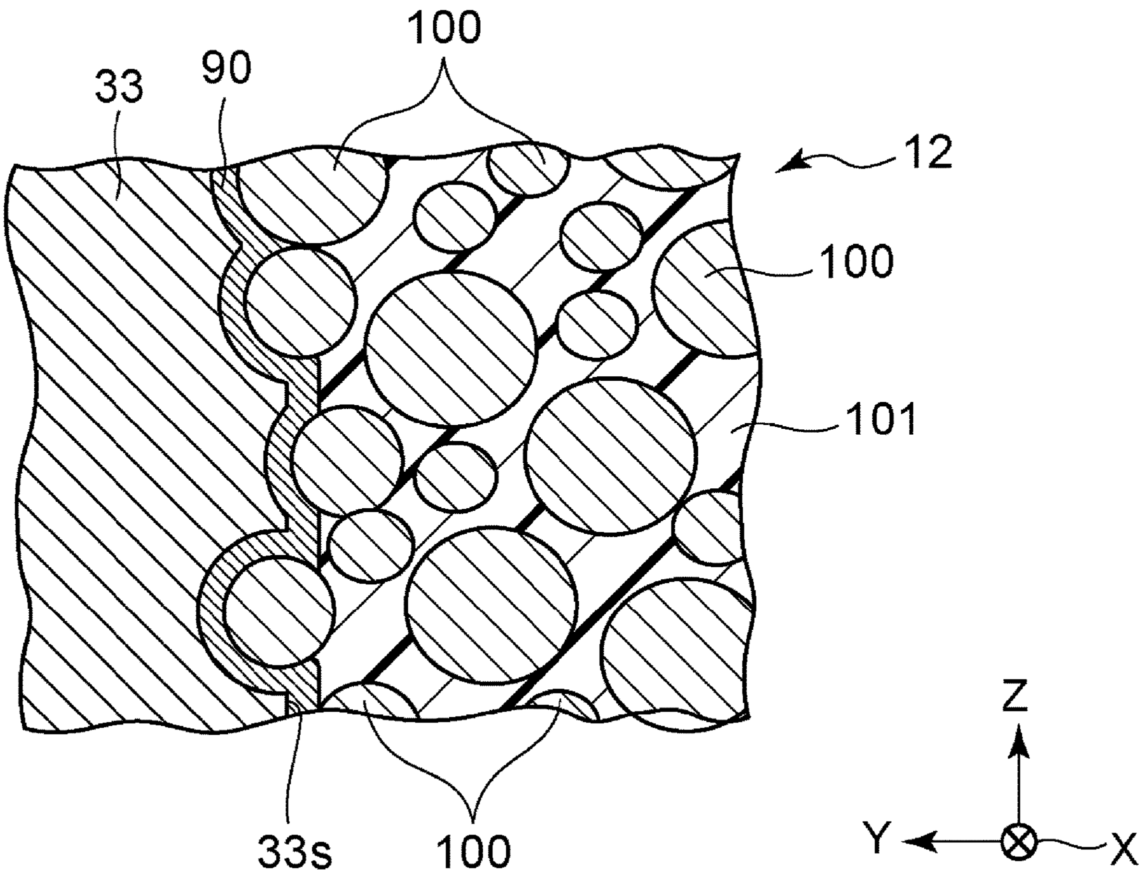
FIG. 6 is a schematic sectional view illustrating a second embodiment of the inductor component.

FIG. 6 is a schematic sectional view illustrating a second embodiment of the inductor component. The second embodiment is different from the first embodiment in configurations of a columnar wire and a side surface of a conductive protection film. The different configurations will be described below. Note that, in the second embodiment, since the same reference numerals as those in the first embodiment denote the same configurations as those in the first embodiment, the description thereof will be omitted.

As illustrated in FIG. 6, a shape of a side surface 33*s* of a third columnar wire 33 is an uneven shape. A surface shape of a conductive protection film 90 has an uneven shape corresponding to the uneven shape of the side surface 33*s*. The uneven shape is formed by a magnetic powder 100 entering the third columnar wire 33. However, due to the presence of the conductive protection film 90 having a relatively high hardness, when the magnetic powder 100 enters the third columnar wire 33, the entry amount can be made smaller than that in the related art, and leak path formation can be suppressed. In addition, by the uneven shape, the close contact between the third columnar wire 33 and the conductive protection film 90, and the second magnetic layer 12 can be secured. As described above, according to the present embodiment, it is possible to secure the close contact between the third columnar wire 33 and the conductive protection film 90, and the second magnetic layer 12 while suppressing the leak path formation as compared with the related art. Note that the same is applied to the first columnar wire 31 and the second columnar wire 32 and the conductive protection film 90 covering the side surfaces thereof.

Third Embodiment

Figure 7:
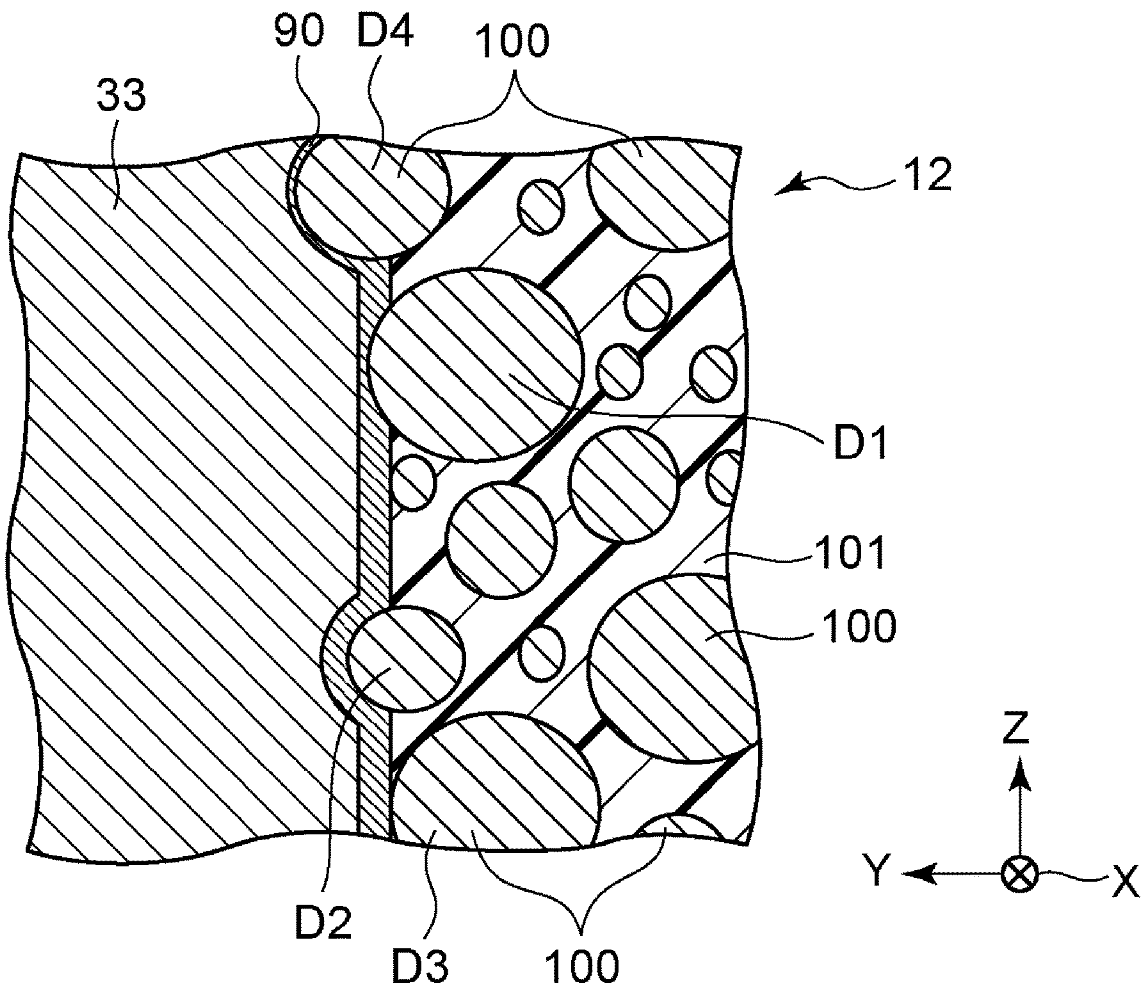
FIG. 7 is a schematic sectional view illustrating a third embodiment of the inductor component.

FIG. 7 is a schematic sectional view illustrating a third embodiment of the inductor component. The third embodiment is different from the second embodiment in a configuration of a side surface of a conductive protection film. The different configurations will be described below. Note that, in the third embodiment, since the same reference numerals as those in the second embodiment denote the same configurations as those in the second embodiment, the description thereof will be omitted.

As illustrated in FIG. 7, at least one (a magnetic powder indicated by reference numeral D1) of a plurality of magnetic powders 100 enters a conductive protection film 90 without entering a third columnar wire 33. In the present embodiment, a conductive material of the third columnar wire 33 is preferably a conductive paste having voids. The conductive paste is, for example, an Ag paste. Note that, in FIG. 7, the magnetic powder 100 indicated by reference numeral D2 does not enter the conductive protection film 90 but enters the third columnar wire 33. In addition, the magnetic powder 100 indicated by reference numeral D3 is in contact with the conductive protection film 90 without entering the third columnar wire 33 and the conductive protection film 90. In addition, the magnetic powder 100 indicated by reference numeral D4 enters both the third columnar wire 33 and the conductive protection film 90. According to the present embodiment, since the magnetic powder 100 also enters the conductive protection film 90, the close contact between the conductive protection film 90 and the second magnetic layer 12 can be further improved.

Fourth Embodiment

Figure 8:
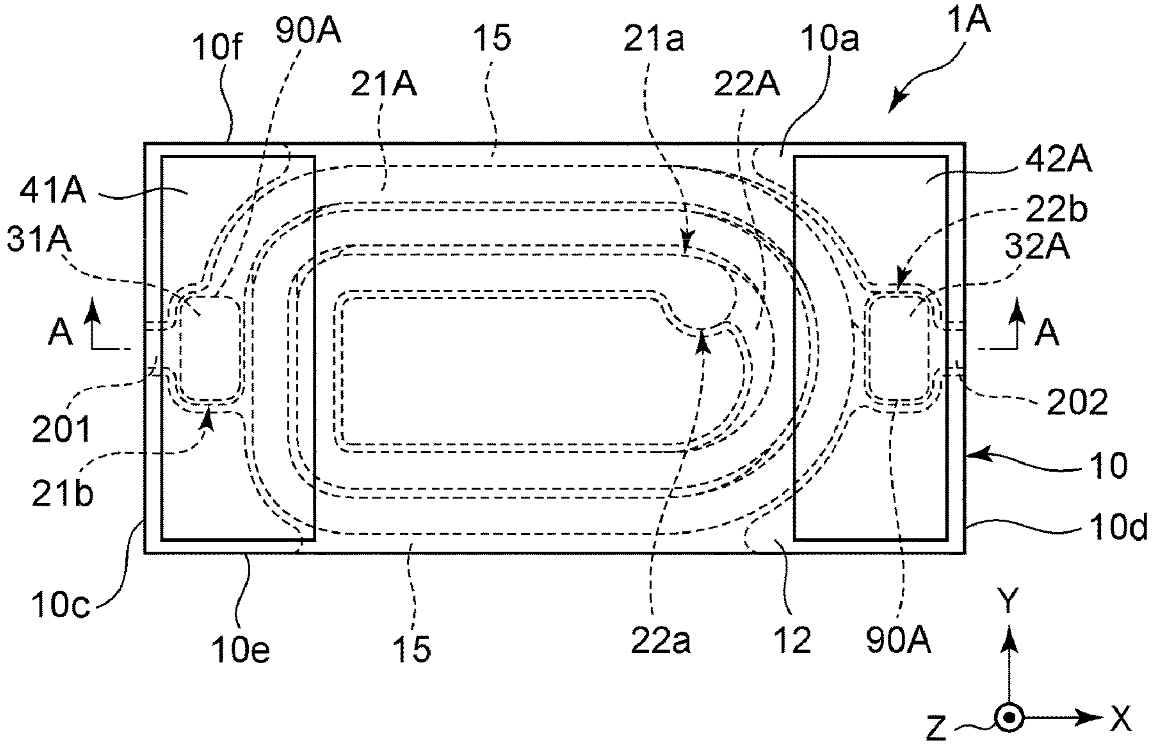
FIG. 8 is a schematic plan view illustrating a fourth embodiment of the inductor component.
Figure 9:
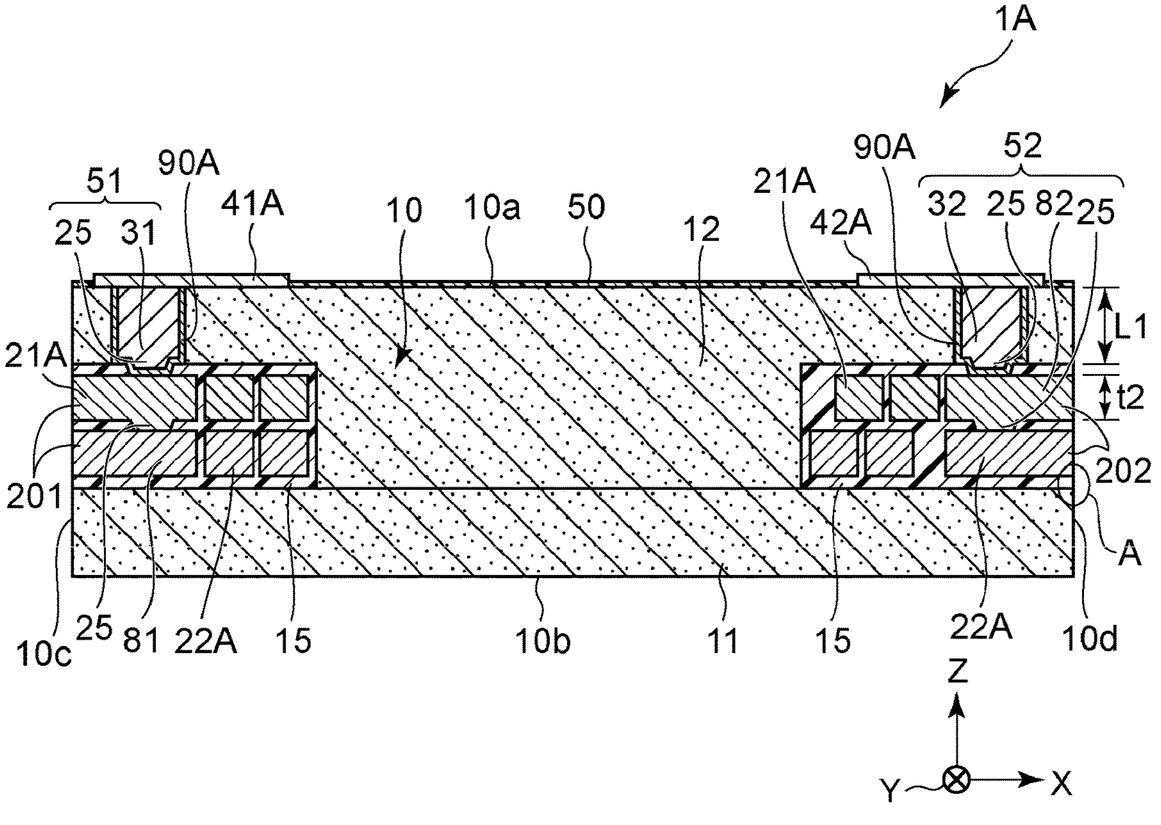
FIG. 9 is a sectional view taken along the line A-A of FIG. 8.

FIG. 8 is a schematic sectional view illustrating a fourth embodiment of the inductor component. FIG. 9 is a sectional view taken along the line A-A of FIG. 8. The fourth embodiment is different from the first embodiment in configurations of an inductor wire, a vertical wire, a conductive protection film, and an external terminal. The different configurations will be described below. Note that, in the fourth embodiment, since the same reference numerals as those in the first embodiment denote the same configurations as those in the first embodiment, the description thereof will be omitted.

As illustrated in FIGS. 8 and 9, an inductor component 1A includes an element body 10, a first inductor wire 21A and a second inductor wire 22A, an insulating layer 15, a first vertical wire 51 (a first columnar wire 31A and a via wire 25) and a second vertical wire 52 (a second columnar wire 32A, a second connection wire 82, and a via wire 25), a conductive protection film 90A, a first external terminal 41A and a second external terminal 42A, and a coating film 50. The first inductor wire 21A and the second inductor wire 22A, the insulating layer 15, the first vertical wire 51 and the second vertical wire 52, and the conductive protection film 90A are provided in the element body 10. The first and second external terminals 41A and 42A and the coating film 50 are provided on a first principal surface 10*a* of the element body 10. The element body 10 has a first magnetic layer 11 and a second magnetic layer 12 sequentially stacked along the forward Z direction.

The first inductor wire 21A is a wire that is provided above the second inductor wire 22A and extends in a spiral shape along the first principal surface 10*a* of the element body 10. The number of turns of the first inductor wire 21A is preferably more than one turn. As a result, inductance can be improved. For example, the first inductor wire 21A is spirally wound in a clockwise direction from an outer peripheral end 21*b* toward an inner peripheral end 21*a* when viewed from a Z direction. A conductive material of the first inductor wire 21A is similar to the conductive material of the first inductor wire 21 according to the first embodiment.

The second inductor wire 22A is a wire extending in a spiral shape along the first principal surface 10*a* of the element body 10. The number of turns of the second inductor wire 22A is preferably more than one turn. As a result, inductance can be improved. The second inductor wire 22A is spirally wound in a clockwise direction from an inner peripheral end 22*a* toward an outer peripheral end 22*b* when viewed from the Z direction. The second inductor wire 22A is disposed between the first inductor wire 21A and the first magnetic layer 11. As a result, the first inductor wire 21A and the second inductor wire 22A are disposed side by side in the direction (Z direction) orthogonal to the first principal surface 10*a*. The conductive material of the second inductor wire 22A is similar to the conductive material of the first inductor wire 21 according to the first embodiment. The outer peripheral end 21*b* of the first inductor wire 21A and the outer peripheral end 22*b* of the second inductor wire 22A correspond to "ends" described in the claims.

The outer peripheral end 21*b* of the first inductor wire 21A is connected to the first external terminal 41A with the conductive protection film 90A and the first vertical wire 51 (the via wire 25 and the first columnar wire 31A) on the outer peripheral end 21*b* interposed therebetween. The inner peripheral end 21*a* of the first inductor wire 21A is connected to the inner peripheral end 22*a* of the second inductor wire 22A with the via wire 25 (not illustrated in the drawings) below the inner peripheral end 21*a* interposed therebetween.

The outer peripheral end 22*b* of the second inductor wire 22A is connected to the second external terminal 42 with the second vertical wire 52 (the second columnar wire 32A, the second connection wire 82, and the via wire 25) on the outer peripheral end 22*b* and the conductive protection film 90A interposed therebetween. With the above configuration, the first inductor wire 21A and the second inductor wire 22A are connected in series and electrically connected to the first external terminal 41 and the second external terminal 42.

Note that, in the present embodiment, the first connection wire 81 is provided on the same layer as the second inductor wire 22A. The first connection wire 81 is disposed below (reverse Z direction) the outer peripheral end 21*b* of the first inductor wire 21A, and is connected only to a bottom surface of the first inductor wire 21A with the via wire 25 interposed therebetween. The first connection wire 81 is not connected to the second inductor wire 22A and is electrically independent. By providing the first connection wire 81, the outer peripheral end 21*b* of the first inductor wire 21A can be provided in the same layer as the wound portion of the first inductor wire 21A, and disconnection or the like can be suppressed.

The insulating layer 15 is a film-like layer formed on the first magnetic layer 11, and covers at least the first and second inductor wires 21A and 22A. Specifically, the insulating layer 15 covers all bottom and side surfaces of the first and second inductor wires 21A and 22A, and covers top surfaces of the first and second inductor wires 21A and 22A except for connection portions with the via wire 25. The insulating layer 15 has a hole at a position corresponding to the inner peripheral portion of each of the first and second inductor wires 21A and 22A. A thickness of the insulating layer 15 between the top surface of the first magnetic layer 11 and the bottom surface of the second inductor wire 22A is, for example, 10 μm or less.

The insulating layer 15 is made of an insulating material that does not contain a magnetic body, and is made of a resin material such as an epoxy-based resin, a phenol-based resin, or a polyimide-based resin. Note that the insulating layer 15 may contain a non-magnetic filler such as silica, and in this case, the strength, processability, and electrical characteristics of the insulating layer 15 can be improved. The insulating layer 15 corresponds to a "second insulating layer" described in the claims.

The first magnetic layer 11 is in close contact with the bottom surfaces of the second magnetic layer 12 and the insulating layer 15. The second magnetic layer 12 is disposed above the first magnetic layer 11. The first and second inductor wires 21A and 22A are disposed between the first magnetic layer 11 and the second magnetic layer 12. The second magnetic layer 12 is formed along the insulating layer 15 so as to cover not only portions on the first and second inductor wires 21A and 22A but also the inner peripheral portions of the first and second inductor wires 21A and 22A.

The first vertical wire 51 is made of a conductive material, is located above the first inductor wire 21A, extends in the Z direction, and penetrates the inside of the second magnetic layer 12. The first vertical wire 51 includes the via wire 25 located above the outer peripheral end 21*b* of the first inductor wire 21A and extending in the Z direction, and the first columnar wire 31A extending in the forward Z direction from the via wire 25 and penetrating the inside of the first magnetic layer 11.

The second vertical wire 52 is made of a conductive material, is located above the second inductor wire 22A, extends in the Z direction, and penetrates the inside of the insulating layer 15 and the second magnetic layer 12. The second vertical wire 52 includes the via wire 25 located above the outer peripheral end 22*b* of the second inductor wire 22A and extending in the Z direction, the second connection wire 82 extending in the forward Z direction from the via wire 25 and penetrating the inside of the insulating layer 15, the via wire 25 located above the second connection wire 82 and electrically connected to the second connection wire 82 with the conductive protection film 90A interposed therebetween, and the second columnar wire 32A extending in the forward Z direction from the via wire 25 and penetrating the inside of the second magnetic layer 12. The first and second vertical wires 51 and 52 are made of the same material as the first inductor wire 21A.

A wire length (reference numeral L1 illustrated in FIG. 9) of each of the first and second vertical wires 51 and 52 is larger than a thickness (reference numeral t2 illustrated in FIG. 9) of the first inductor wire 21A in a direction orthogonal to the first principal surface 10*a*. Here, the wire length of the vertical wire refers to the length of the vertical wire in the extending direction (Z direction). In addition, when the vertical wire includes at least one of the via wire and the connection wire as in the present embodiment, the "wire length of the vertical wire" means the wire length of the columnar wire. According to the above configuration, since the volume of the second magnetic layer 12, that is, the volume of the element body 10 can be increased as compared with a case where the wire lengths of the first and second vertical wires 51 and 52 are smaller than the thickness of the first inductor wire 21A, the inductance of the inductor component 1A can be increased.

The conductive protection film 90A is a protection film that protects the first and second vertical wires 51 and 52 from the magnetic powder of the second magnetic layer 12. The conductive protection film 90A has a higher hardness than the first and second vertical wires 51 and 52. A material constituting the conductive protection film 90A may be the same as that of the first embodiment.

The conductive protection film 90A covers at least part of the side surfaces of the first vertical wire 51 and the second vertical wire 52. Specifically, the conductive protection film 90A covers the side surface and the bottom surface of the first vertical wire 51 (the via wire 25 and the first columnar wire 31A) and the side surface and the bottom surface of the via wire 52 extending downward from the second columnar wire 32A and the second columnar wire 32A of the second vertical wire 52. The conductive protection film 90A covering the side surface of the first columnar wire 31A is in contact with the second magnetic layer 12. The conductive protection film 90A covering the side surface of the via wire 25 (hereinafter, referred to as the "first via wire") extending downward from the first columnar wire 31A is in contact with the insulating layer 15. The conductive protection film 90A covering the bottom surface of the first via wire 25 is in contact with the top surface of the outer peripheral end 21*b* of the first inductor wire 21A. In other words, the conductive protection film 90A covering the bottom surface of the first via wire 25 is provided between the first via wire 25 and the first inductor wire 21A, and electrically connects the first via wire 25 and the first inductor wire 21A.

The conductive protection film 90A covering the side surface of the second columnar wire 32A is in contact with the second magnetic layer 12. The conductive protection film 90A covering the side surface of the via wire 25 (hereinafter, referred to as the "second via wire") extending downward from the second columnar wire 32A is in contact with the insulating layer 15. The conductive protection film 90A covering the bottom surface of the second via wire 25 is in contact with the top surface of the second connection wire 82. In other words, the conductive protection film 90A covering the bottom surface of the second via wire 25 is provided between the second via wire 25 and the second connection wire 82, and electrically connects the second via wire 25 and the second connection wire 82. With the above configuration, among the side surfaces of the first vertical wire 51 and the second vertical wire 52, the side surface not covered with the insulating layer 15 is covered with the conductive protection film 90A.

The first and second external terminals 41A and 42A are made of a conductive material, and have a three-layer configuration in which, for example, Cu having low electric resistance and excellent stress resistance, Ni having excellent corrosion resistance, and Au having excellent solder wettability and reliability are arranged in this order from the inside to the outside. A thickness of each layer of Cu/Ni/Au is, for example, 5/5/0.01 μm.

The first external terminal 41A is provided on the top surface (first principal surface 10*a*) of the second magnetic layer 12, and covers the end face of the first columnar wire 31A exposed from the top surface. As a result, the first external terminal 41A is electrically connected to the outer peripheral end 21*b* of the first inductor wire 21A. The second external terminal 42A is provided on the top surface of the second magnetic layer 12 and covers the end face of the second columnar wire 32A exposed from the top surface. As a result, the second external terminal 42A is electrically connected to the outer peripheral end 22*b* of the second inductor wire 22A.

The first and second external terminals 41A and 42A are preferably subjected to a rust prevention treatment. Here, the rust prevention treatment means coating with Ni and Au, Ni and Sn, or the like. As a result, copper corrosion due to solder or dust can be suppressed, and the inductor component 1A with high mounting reliability can be provided.

The coating film 50 is made of an insulating material, is provided on the top surface of the second magnetic layer 12, and exposes the end faces of the first and second columnar wires 31A and 32A and the first and second external terminals 41A and 42A. By the coating film 50, it is possible to suppress the short circuit between the first external terminal 41A and the second external terminal 42A. The coating film 50 corresponds to a "first insulating layer" described in the claims. Note that the coating film 50 may be formed on the side of the bottom surface of the first magnetic layer 11.

According to the present embodiment, among the side surfaces of the first and second vertical wires 51 and 52, the side surface not covered with the insulating layer 15 is covered with the conductive protection film 90A having a higher hardness than the first and second vertical wires 51 and 52. Therefore, entry of the conductive protection film 90A and the magnetic powder 100 into the first and second vertical wires 51 and 52 can be reduced. As a result, it is possible to reduce the contact area between the conductive protection film 90A and the magnetic powder 100 while reducing the contact area between the first and second vertical wires 51 and 52 and the conductive protection film 90A at the entry portion, and the conduction path between the first and second vertical wires 51 and 52 and the magnetic powder 100 can be reduced. As a result, leak path formation between the respective vertical wires of the first and second vertical wires 51 and 52 can be suppressed.

In addition, since the plurality of inductor wires 21A and 22A are disposed side by side in the direction orthogonal to the first principal surface 10*a* and are electrically connected in series, the inductance can be increased as compared with a case where there is only one inductor wire.

(Manufacturing Method)

Next, a method for manufacturing the inductor component 1A will be described. FIGS. 10A to 10L correspond to a section (FIG. 9) taken along the line A-A of FIG. 8.

Figure 10A:
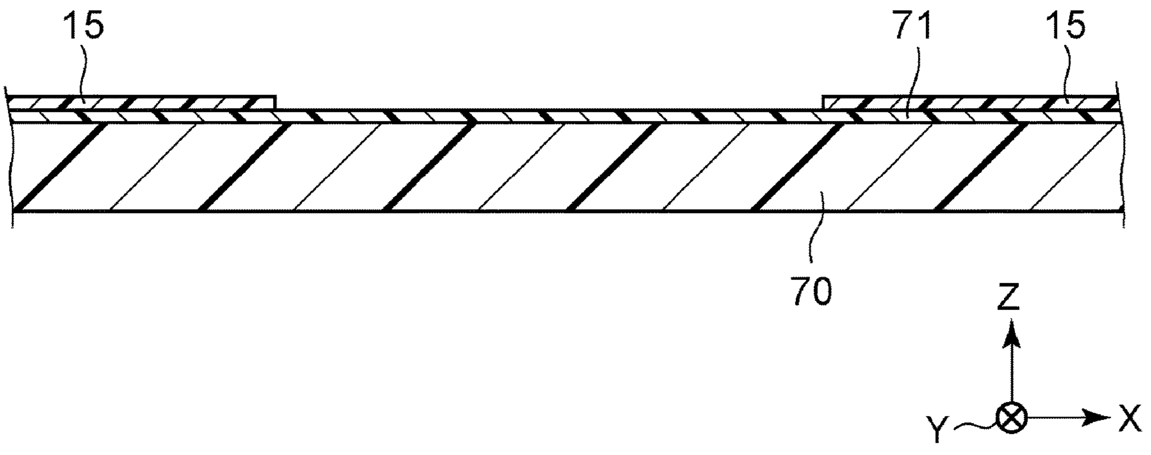
FIG. 10A is an explanatory diagram illustrating a manufacturing method of the inductor component.

As illustrated in FIG. 10A, the base substrate 70 is prepared. A base insulating layer 71 is applied onto the principal surface of the base substrate 70 to solidify the base insulating layer 71. The second insulating layer 15 is applied onto the base insulating layer 71, and a predetermined pattern is formed using a photolithography method and solidified.

Figure 10B:
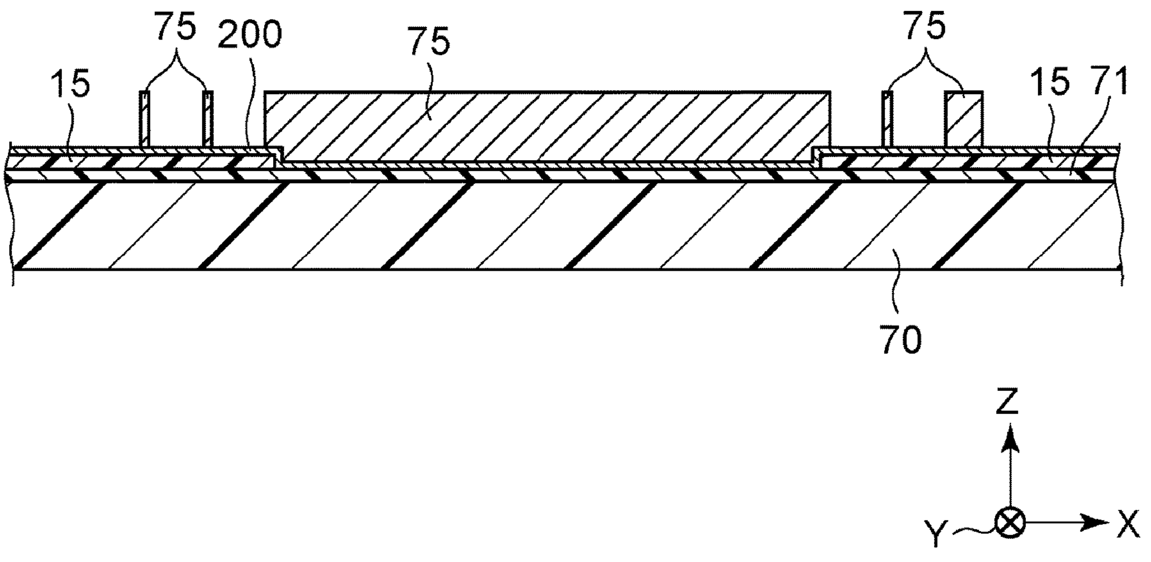
FIG. 10B is an explanatory diagram illustrating a manufacturing method of the inductor component.

As illustrated in FIG. 10B, the seed layer 200 is formed on the base insulating layer 71 and the second insulating layer 15 by a known method such as a sputtering method or a vapor deposition method. The seed layer 200 is, for example, Ti/Cu. Thereafter, a dry film resist (DFR) 75 is attached, and a predetermined pattern is formed on the DFR 75 using a photolithography method. The predetermined pattern is a through hole corresponding to a position where the second inductor wire 22A, the first connection wire 81, and the first and second extended wires 201 and 202 are provided on the second insulating layer 15.

Figure 10C:
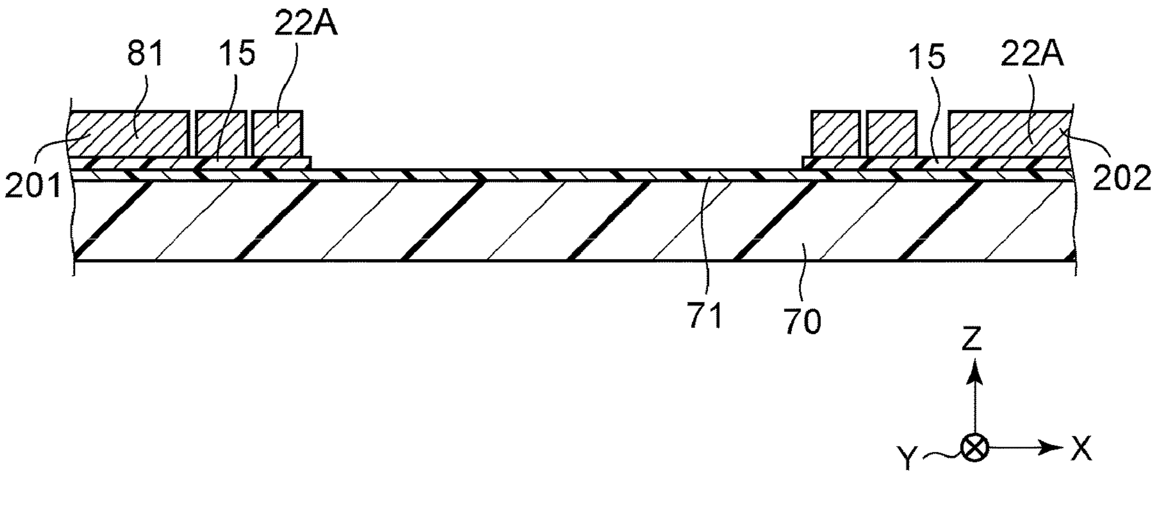
FIG. 10C is an explanatory diagram illustrating a manufacturing method of the inductor component.

As illustrated in FIG. 10C, while power is supplied to the seed layer 200, the second inductor wire 22A, the first connection wire 81, and the first and second extended wires 201 and 202 are formed on the second insulating layer 15 using an electrolytic plating method. Thereafter, the DFR 75 is peeled off, and the seed layer 200 is etched. Note that, in FIGS. 10C to 10L, the description of the seed layer 200 is omitted for convenience.

Figure 10D:
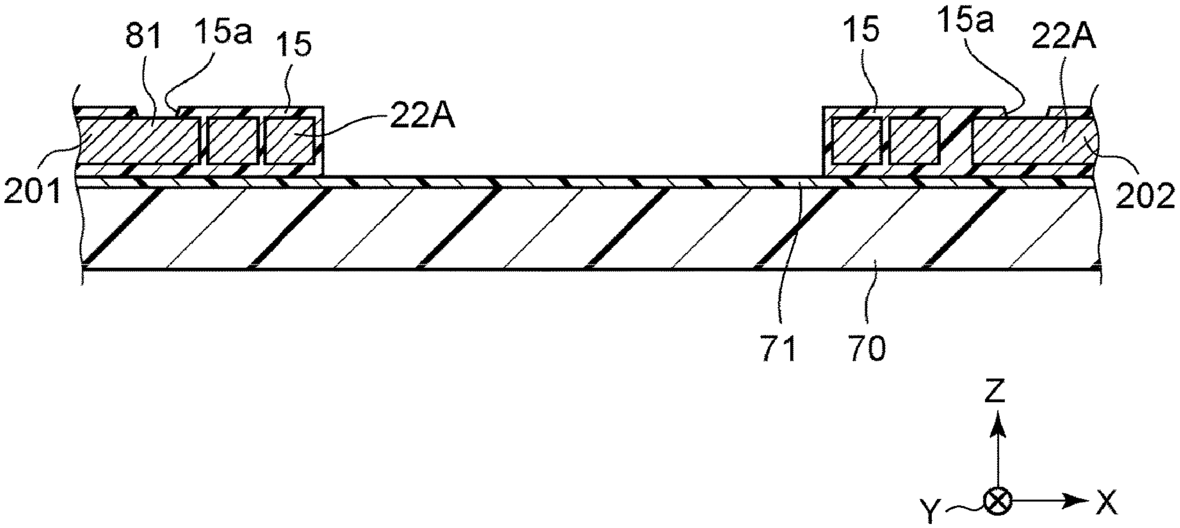
FIG. 10D is an explanatory diagram illustrating a manufacturing method of the inductor component.

As illustrated in FIG. 10D, the second insulating layer 15 is further applied so as to cover the exposed surfaces of the second inductor wire 22A, the first connection wire 81, the first and second extended wires 201 and 202, and the base insulating layer 71. Then, the second insulating layer 15 is solidified by forming a via 15*a* corresponding to a position where the via wire 25 is provided and a through hole corresponding to a portion to be a magnetic path using a photolithography method.

Figure 10E:
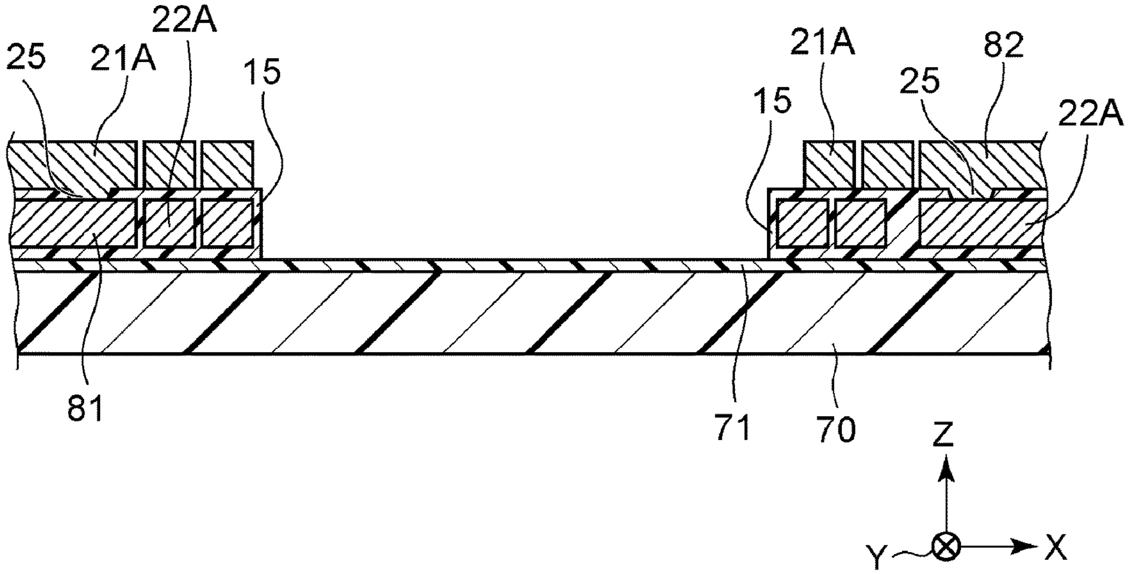
FIG. 10E is an explanatory diagram illustrating a manufacturing method of the inductor component.

As illustrated in FIG. 10E, a seed layer not illustrated in the drawings is formed on the base insulating layer 71 and the second insulating layer 15 by a known method such as a sputtering method or a vapor deposition method. The seed layer is, for example, Ti/Cu. Thereafter, a DFR is attached, and a predetermined pattern is formed in the DFR using a photolithography method. At this time, the DFR is left in the portion to be the magnetic path, and the portion to be the magnetic path is protected. The predetermined pattern is a through hole corresponding to a position where the first inductor wire 21A and the second connection wire 82 on the second insulating layer 15 and the via wire 25 on the second inductor wire 22A and the first connection wire 81 are provided. Thereafter, while power is supplied to the seed layer, the via wire 25 is formed in the via 15*a*, and the first inductor wire 21A and the second connection wire 82 are formed on the second insulating layer 15 by using an electrolytic plating method. Thereafter, the DFR 75 is peeled off, and the seed layer is etched.

Figure 10F:
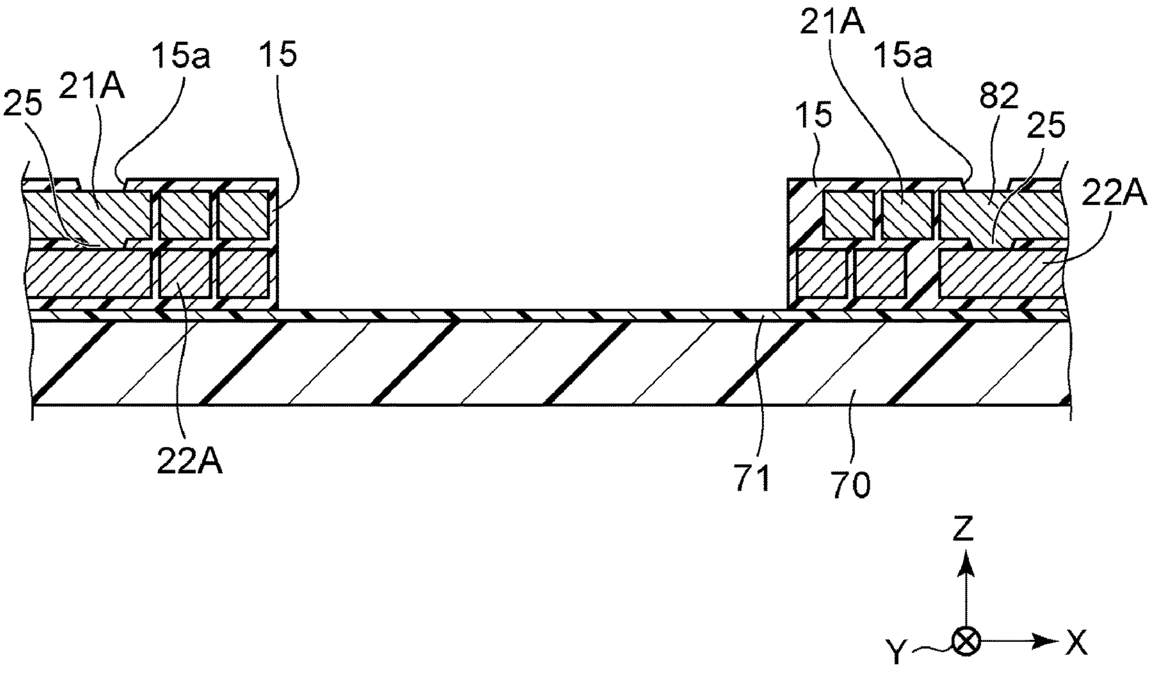
FIG. 10F is an explanatory diagram illustrating a manufacturing method of the inductor component.

As illustrated in FIG. 10F, the second insulating layer 15 is further applied so as to cover the exposed surfaces of the first inductor wire 21A and the base insulating layer 71. Then, the second insulating layer 15 is solidified by forming a via 15*a* corresponding to a position where the via wire 25 is provided and a through hole corresponding to a portion to be a magnetic path using a photolithography method. The solidified second insulating layer 15 becomes the insulating layer 15 illustrated in FIG. 7.

Figure 10G:
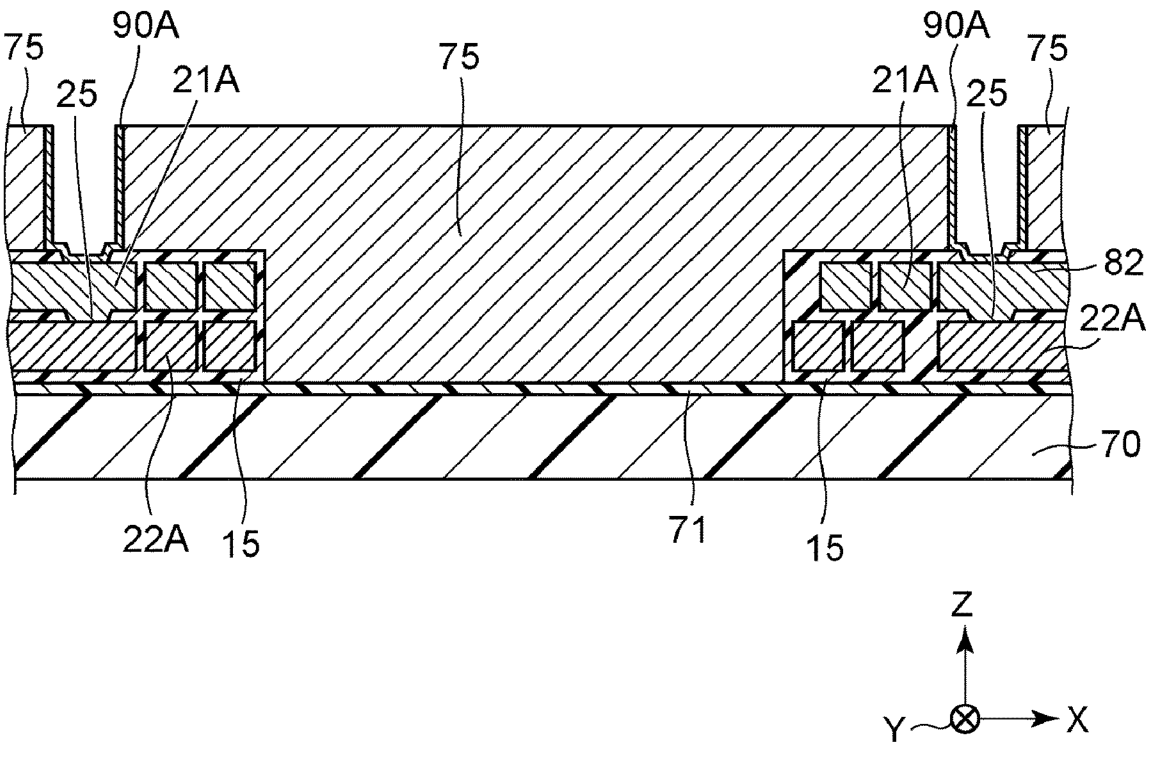
FIG. 10G is an explanatory diagram illustrating a manufacturing method of the inductor component.

As illustrated in FIG. 10G, the DFR 75 is attached again, and a predetermined pattern is formed on the DFR 75 using a photolithography method. At this time, the DFR is left in the portion to be the magnetic path, and the portion to be the magnetic path is protected. The predetermined pattern is a through hole corresponding to a position where the first vertical wire 51 (the first columnar wire 31A and the first via wire 25), the second columnar wire 32A and the second via wire 25 of the second vertical wire 52, and the conductive protection film 90A are provided. Thereafter, the conductive protection film 90A is formed on the inner surface of the through hole by a sputtering method. At this time, a mask is used such that the conductive protection film 90A is not formed on a portion other than the inner surface of the through hole. Alternatively, the conductive protection film 90A may be formed on the inner surface of the through hole using an electroless plating method.

Figure 10H:
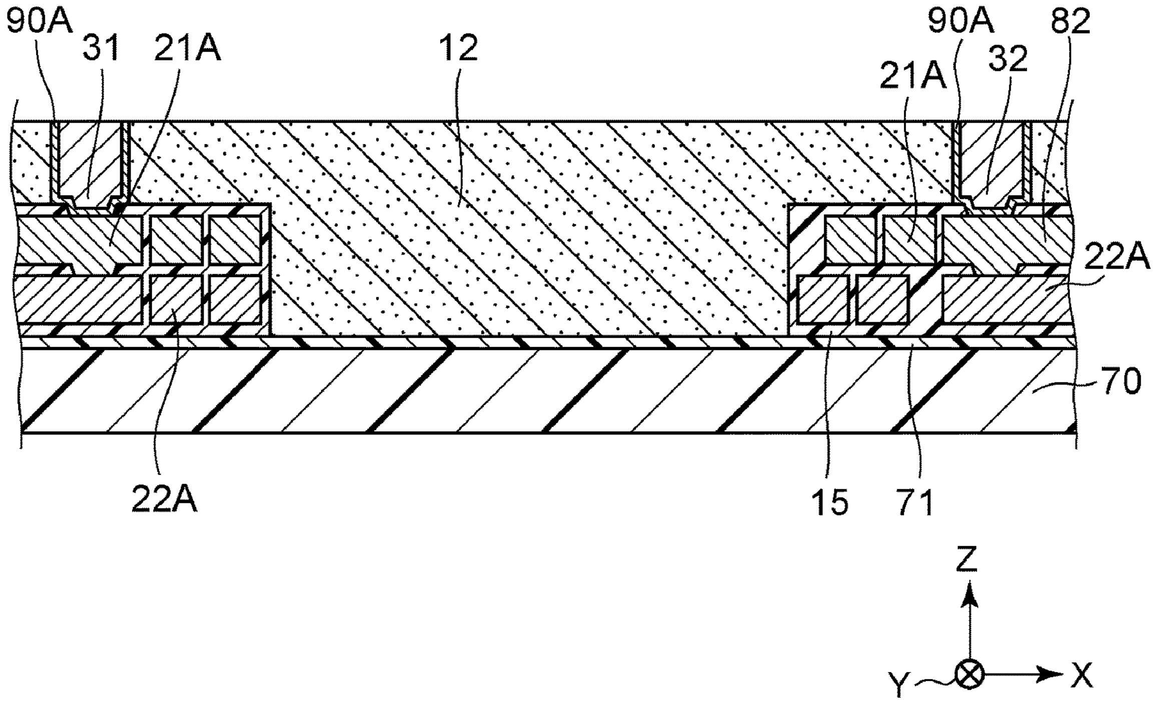
FIG. 10H is an explanatory diagram illustrating a manufacturing method of the inductor component.

As illustrated in FIG. 10H, the first vertical wire 51 and the second columnar wire 32A and the second via wire 25 of the second vertical wire 52 are formed in the through hole by using an electrolytic plating method while power is supplied to the first inductor wire 21A and the second inductor wire 22A. Thereafter, the DFR 75 is peeled off, and a magnetic sheet to be the second magnetic layer 12 is pressure-bonded from above the first inductor wire 21A toward the first inductor wire 21A. As a result, the second insulating layer 15 and the conductive protection film 90A covering the side surfaces of the first and second columnar wires 31A and 32A are covered with the second magnetic layer 12. Thereafter, the second magnetic layer 12 is solidified, and the top surface thereof is ground to expose the end faces of the first columnar wire 31A, the second columnar wire 32A, and the conductive protection film 90A from the top surface of the second magnetic layer 12.

Figure 10I:
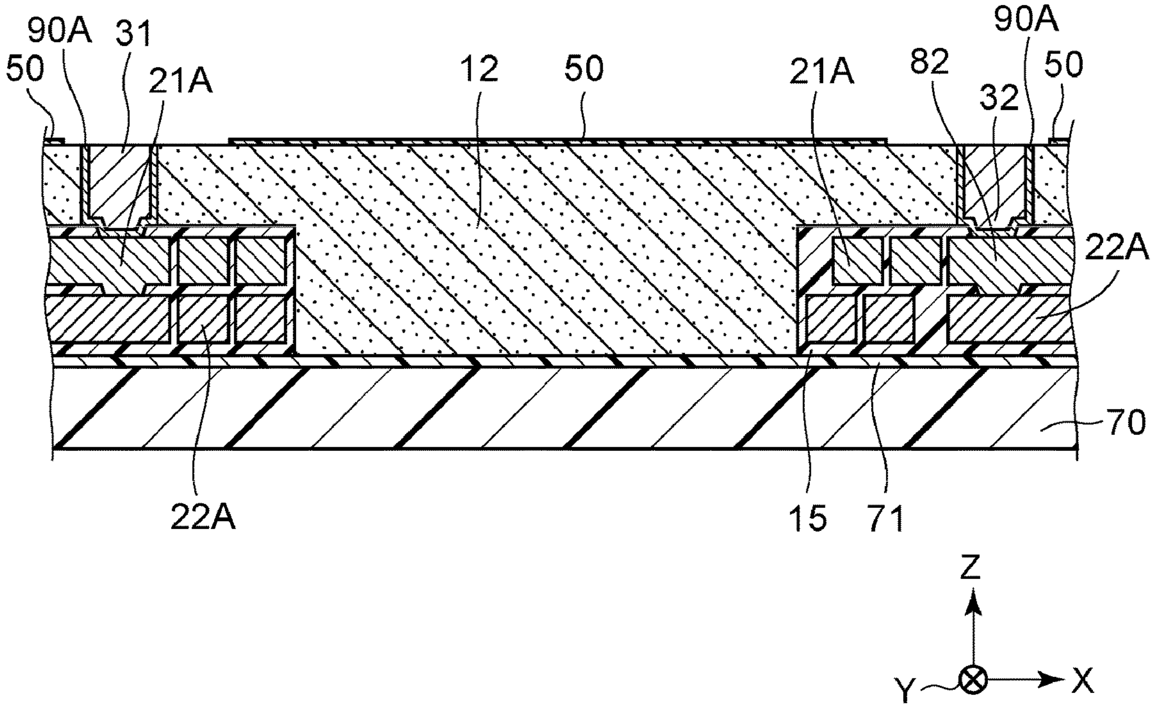
FIG. 10I is an explanatory diagram illustrating a manufacturing method of the inductor component.

As illustrated in FIG. 10I, the third insulating layer 50 is applied to the top surface of the second magnetic layer 12. Then, the third insulating layer 50 is formed in a predetermined pattern by using a photolithography method and solidified. The predetermined pattern is a pattern in which the third insulating layer can cover a region of the top surface of the second magnetic layer 12 excluding regions where the first and second external terminals 41A and 42A are formed. The solidified third insulating layer 50 becomes the coating film 50 illustrated in FIG. 7.

Figure 10J:
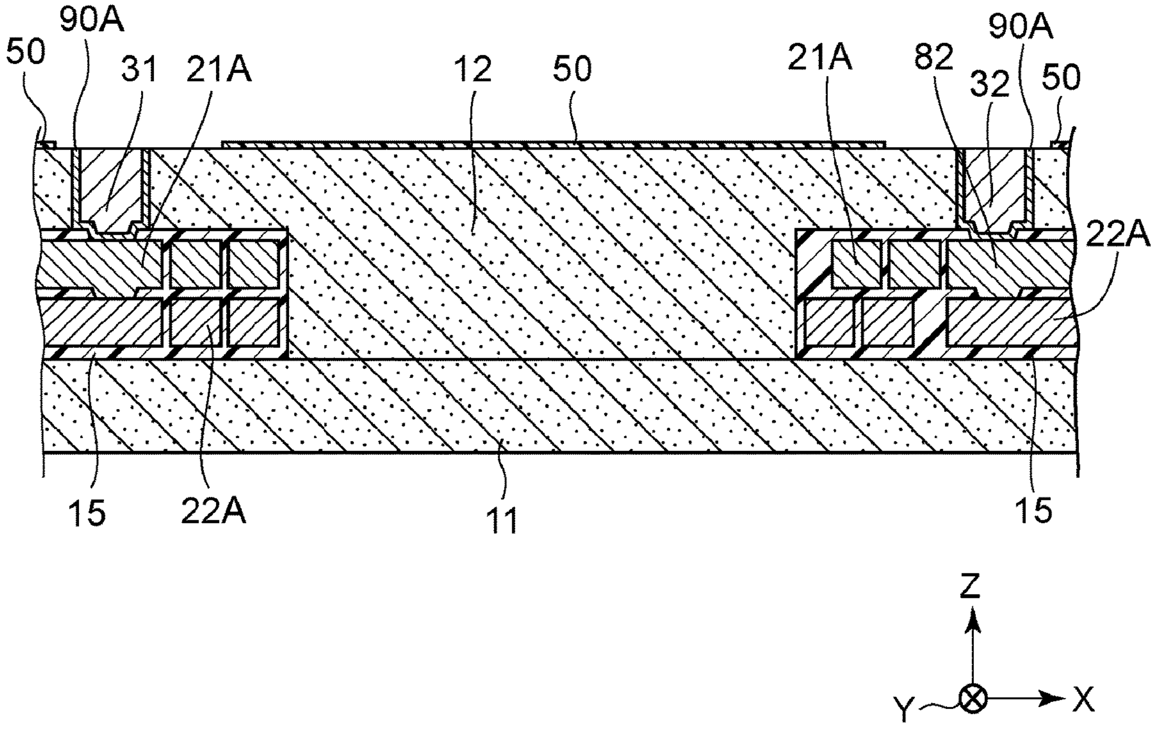
FIG. 10J is an explanatory diagram illustrating a manufacturing method of the inductor component.

As illustrated in FIG. 10J, the base substrate 70 and the base insulating layer 71 are removed by polishing. At this time, the base insulating layer 71 may be used as a peeling layer, and the base substrate 70 and the base insulating layer 71 may be removed by peeling. Thereafter, another magnetic sheet to be the first magnetic layer 11 is pressure-bonded from below the second inductor wire 22A toward the second inductor wire 22A, and the bottom surfaces of the second insulating layer 15 and the second magnetic layer 12 are covered with the first magnetic layer 11. Thereafter, the first magnetic layer 11 is solidified and ground to a predetermined thickness.

Figure 10K:
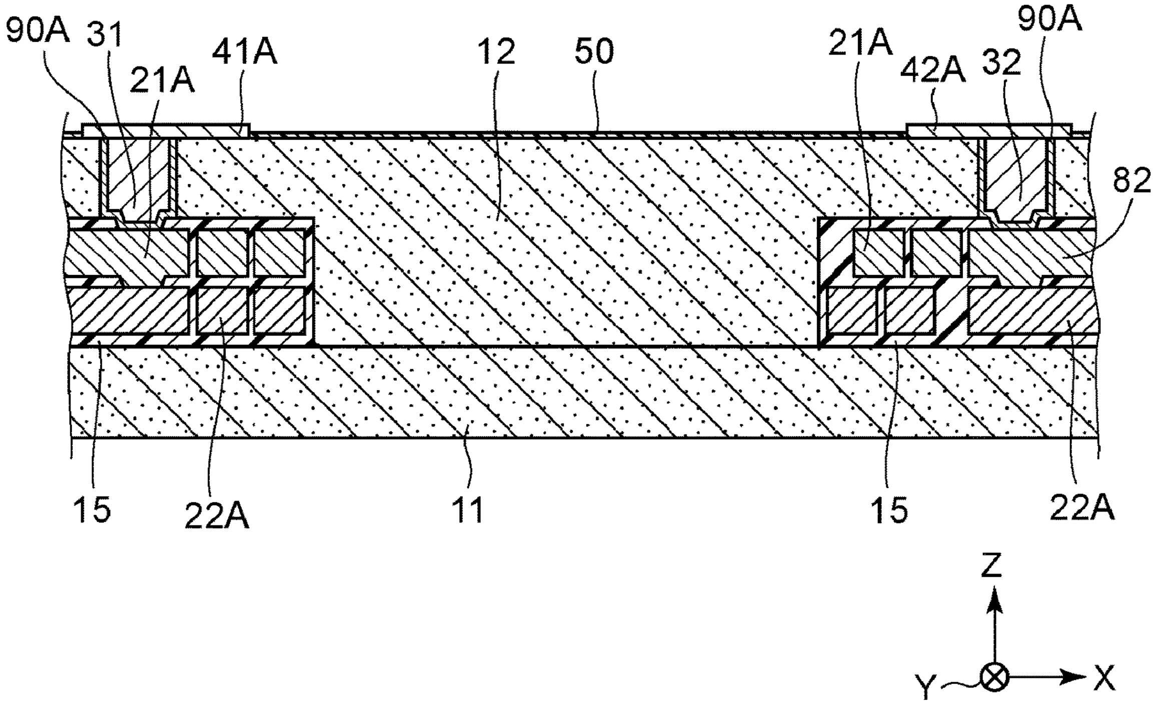
FIG. 10K is an explanatory diagram illustrating a manufacturing method of the inductor component.

As illustrated in FIG. 10K, the first and second external terminals 41A and 42A are formed by electroless plating so as to cover the end faces of the first and second columnar wires 31A and 32A and the conductive protection film 90A exposed from the first principal surface 10*a*. The first and second external terminals 41A and 42A are, for example, Cu/Ni/Au stacked sequentially from the side of the first principal surface 10*a*. Before the first and second external terminals 41A and 42A are formed, a catalyst such as Pd not illustrated in the drawings may be applied to a portion where the first and second external terminals 41A and 42A are in contact with the top surface of the element body 10, the end faces of the first and second columnar wires 31A and 32A, and the end face of the conductive protection film 90A.

Figure 10L:
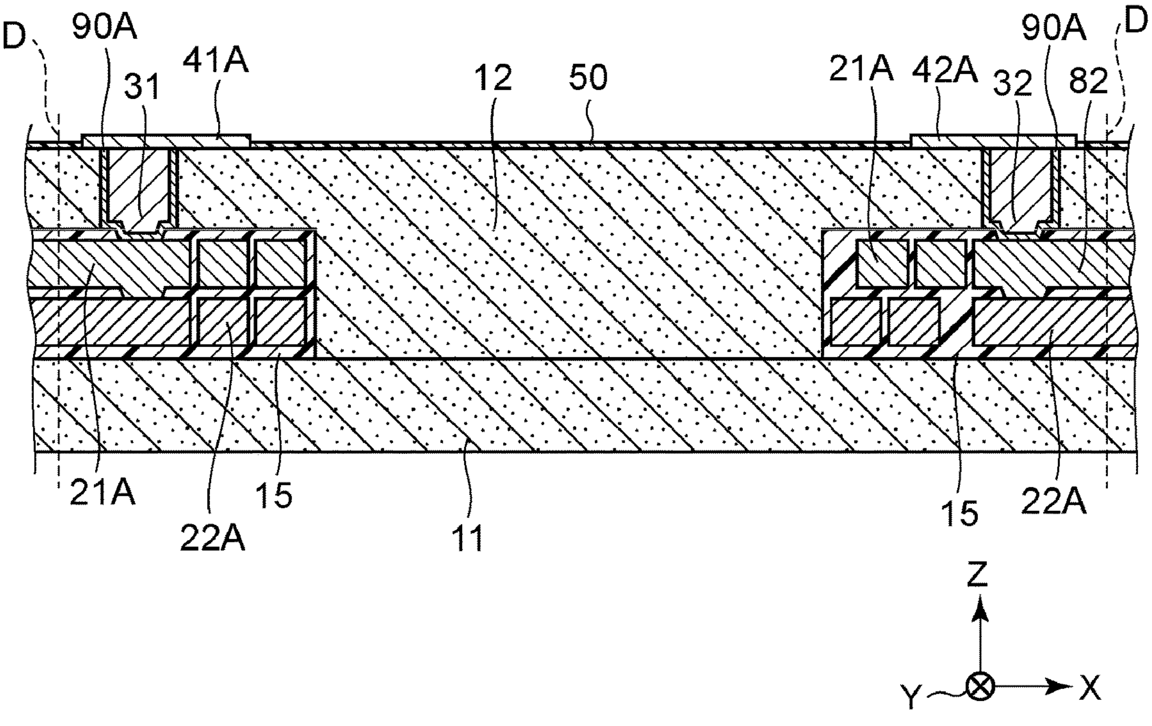
FIG. 10L is an explanatory diagram illustrating a manufacturing method of the inductor component.

As illustrated in FIG. 10L, the inductor component 1A is cut with a dicing machine along a cutting line D. In this way, the inductor component 1A is manufactured as illustrated in FIG. 7.

Fifth Embodiment

Figure 11:
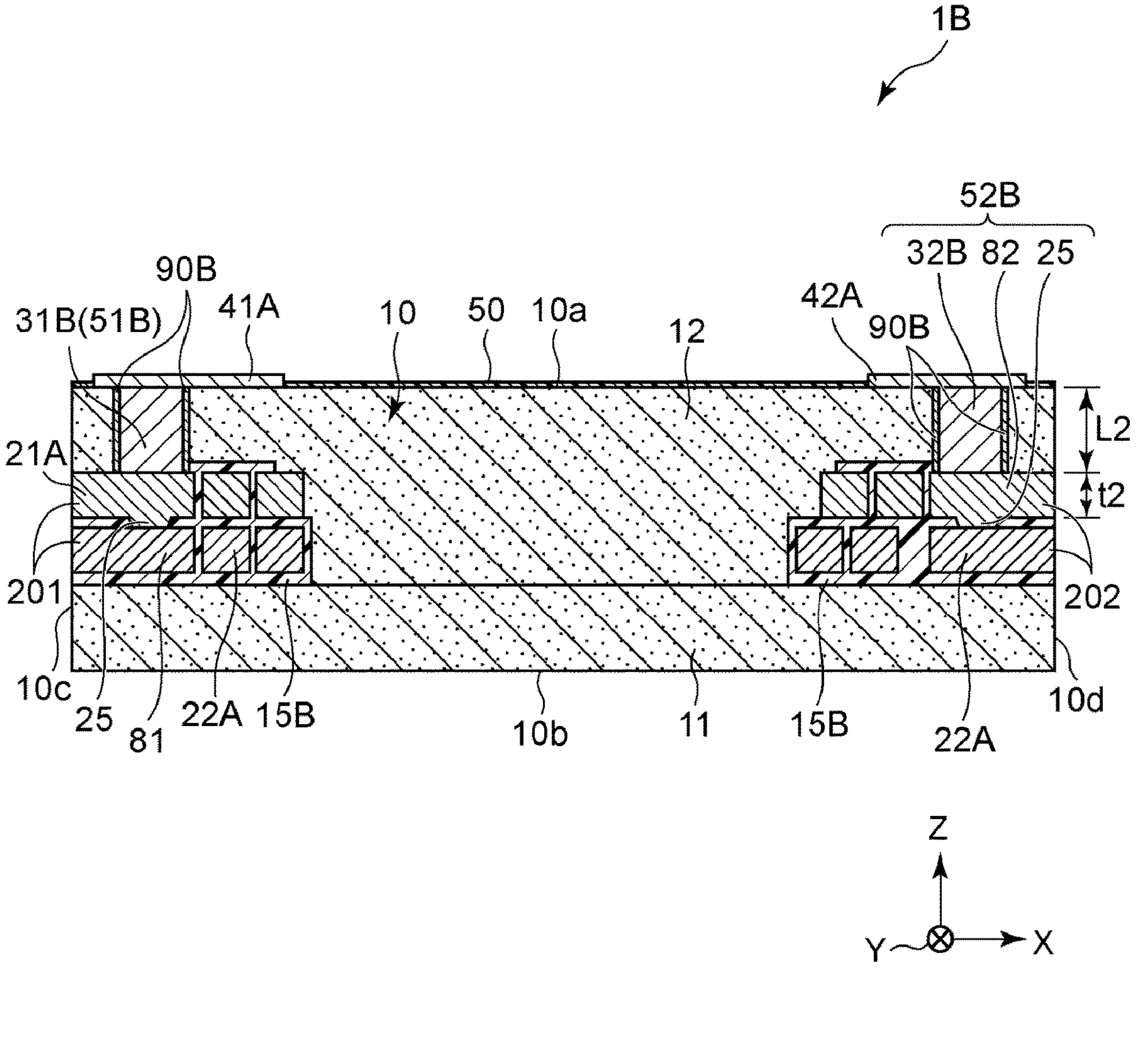
FIG. 11 is a schematic sectional view illustrating a fifth embodiment of the inductor component.

FIG. 11 is a schematic sectional view illustrating a fifth embodiment of the inductor component. The fifth embodiment is different from the fourth embodiment in configurations of a vertical wire, a conductive protection film, and a magnetic layer. The different configurations will be described below. Since the other structures are the same as those of the fourth embodiment, the same reference numerals as those of the first embodiment are given, and the description thereof will be omitted.

As illustrated in FIG. 11, a first columnar wire 31B (first vertical wire 51B) extending from a top surface of a first outer peripheral end 21*b* of a first inductor wire 21A to a first principal surface 10*a* is provided. The first columnar wire 31B penetrates a second magnetic layer 12 and is connected to a first external terminal 41A. A second columnar wire 32B extending from a top surface of a second connection wire 82 to the first principal surface 10*a* is provided. The second columnar wire 32B penetrates the second magnetic layer 12 and is connected to a second external terminal 42A. In the present embodiment, unlike the fourth embodiment, no via wire is provided between the first inductor wire 21A and the first columnar wire 31B and between the second connection wire 82 and the second columnar wire 32B. Further, in the present embodiment, a second vertical wire 52B includes a second connection wire 82, a via wire 25 connecting the second connection wire 82 and the second inductor wire 22A, and a second columnar wire 32B. A conductive protection film 90B covers a side surface of the first columnar wire 31B and a side surface of the second columnar wire 32B.

A wire length L2 of the columnar wires 31B and 32B is larger than a thickness t2 of the inductor wires 21A and 22A in a direction (Z direction) orthogonal to the first principal surface 10*a*. As a result, as compared with a case where the wire length L2 is smaller than the thickness t2, the volume of the second magnetic layer 12, that is, the volume of an element body 10 can be increased, so that the inductance of an inductor component 1B can be increased.

An insulating layer 15B covers the bottom surface and all the side surfaces other than the side surface constituting the inner periphery of the first inductor wire 21A among the side surfaces of the first inductor wire 21A. The insulating layer 15B covers a portion of a top surface of the first inductor wire 21A excluding a connection portion with the first columnar wire 31B, a top surface of the first extended wire 201 of the top layer, a top surface of the second extended wire 202 of the top layer, and a top surface of a portion constituting the turn on the inner peripheral side of the first inductor wire 21A. The insulating layer 15B provided on the top surface of the first inductor wire 21A is in contact with a part of the conductive protection film 90B covering the side surface of the first columnar wire 31B and a part of the conductive protection film 90B covering the side surface of the second columnar wire 32B. That is, the conductive protection film 90B is in contact with both the insulating layer 15B and the second magnetic layer 12. In addition, the insulating layer 15B covers all of the bottom surface and the side surfaces of the second inductor wire 22A, and covers a portion of the top surface of the second inductor wire 22A excluding a connection portion with the via wire 25. The insulating layer 15B corresponds to a "second insulating layer" described in the claims.

According to the present embodiment, since the conductive protection film 90B is in contact with the insulating layer 15B, the close contact between the conductive protection film 90B and the insulating layer 15B can be secured. In addition, since the conductive protection film 90B is also in contact with the second magnetic layer 12, the volume of the second magnetic layer 12 can be increased as compared with a case where the conductive protection film 90B is not in contact with the second magnetic layer 12, and the inductance acquisition efficiency can be improved.

As compared with the contents described in the manufacturing method of the fourth embodiment, in a manufacturing method of the inductor component 1B, the inductor component 1B can be manufactured by various methods such that the first columnar wire 31B is directly connected to the first inductor wire 21A and the second columnar wire 32B is directly connected to the second connection wire 82, without providing the via wire 25.

Note that the present disclosure is not limited to the above-described embodiments, and can be changed in design without departing from the gist of the present disclosure. For example, the respective feature points of the first to fifth embodiments may be variously combined.

In the above embodiments, two inductor wires of the first inductor wire and the second inductor wire are disposed in the element body, but one or three or more inductor wires may be disposed, and at this time, the number of external terminals and the number of columnar wires are also four or more.

In the above embodiments, in one inductor component, the number of columnar wires (vertical wires) is two or three, but is not limited thereto, and may be one or four or more. When the number of columnar wires is one, for example, the number of inductor wires may be one, the first end of the inductor wire may be connected to the columnar wire, and the second end may be connected only to the extended wire extended to the side surface of the element body. In this case, when the two inductor components are adjacent to each other, it is possible to suppress formation of the leak path between the columnar wires.

In the above embodiments, the "inductor wire" is to give the inductance to the inductor component by generating a magnetic flux in the magnetic layer when a current flows, and the structure, shape, material, and the like of the inductor wire are not particularly limited. In particular, various known wire shapes such as meander wire can be used without being limited to a straight line or a curved line (spiral=two-dimensional curved line) extending on a plane as in the embodiments. In addition, the total number of inductor wires is not limited to one layer or two layers, and a multilayer configuration of three or more layers may be used. In addition, the shape of the columnar wire is rectangular when viewed from the Z direction, but may be circular, elliptical, or oval.

What is claimed is:

1. An inductor component comprising:
an element body that includes a plurality of magnetic powders which contains an Fe element as a main component and has a first principal surface and a second principal surface;
an inductor wire that is in the element body and extends along a plane parallel to the first principal surface;
a vertical wire that is in the element body, is connected to an end of the inductor wire, and extends to the first principal surface in a direction orthogonal to the first principal surface; and
a conductive protection film that covers at least a part of a side surface of the vertical wire extending along a direction orthogonal to the first principal surface and has a higher hardness than the vertical wire.

2. The inductor component according to claim 1, wherein
the conductive protection film is in contact with at least one of the plurality of magnetic powders, and
the magnetic powder in contact with the conductive protection film does not enter the side surface of the vertical wire.

3. The inductor component according to claim 1, wherein
a thickness of the conductive protection film is smaller than an equivalent circle diameter of the vertical wire in a section orthogonal to an extending direction of the vertical wire, and
an electrical resistivity of the conductive protection film is larger than an electrical resistivity of the vertical wire.

4. The inductor component according to claim 1, wherein
the conductive protection film includes a plurality of layers.

5. The inductor component according to claim 4, wherein
each of the plurality of layers has a different hardness.

6. The inductor component according to claim 4, wherein
each of the plurality of layers has a different electrical resistivity.

7. The inductor component according to claim 1, wherein
the vertical wire and the conductive protection film are exposed to the first principal surface.

8. The inductor component according to claim 7, further comprising:
an external terminal that is on the first principal surface, wherein
the external terminal is directly connected to at least a part of the vertical wire and the conductive protection film.

9. The inductor component according to claim 8, further comprising:
a first insulating layer that is on the first principal surface.

10. The inductor component according to claim 1, wherein
a surface shape of the conductive protection film is an uneven shape.

11. The inductor component according to claim 1, wherein
the conductive protection film is further between the vertical wire and the inductor wire, and
the vertical wire is electrically connected to the inductor wire with the conductive protection film interposed therebetween.

12. The inductor component according to claim 1, wherein at least a part of the inductor wire is covered with a second insulating layer, and the conductive protection film is in contact with the element body and the second insulating layer.

13. The inductor component according to claim 1, wherein a wire length of the vertical wire is larger than a thickness of the inductor wire in a direction orthogonal to the first principal surface.

14. The inductor component according to claim 1, wherein the inductor wire includes a plurality of inductor wires, and the plurality of inductor wires are disposed on a same plane parallel to the first principal surface and are electrically separated from each other.

15. The inductor component according to claim 1, wherein the inductor wire includes a plurality of inductor wires, and the plurality of inductor wires are disposed side by side in a direction orthogonal to the first principal surface and are electrically connected in series.

16. The inductor component according to claim 1, wherein the conductive protection film includes at least one of a Ti element, an Ni element, an Fe element, and a Cu element.

17. The inductor component according to claim 1, wherein the vertical wire is made of the same material as the inductor wire and includes at least one of an Ag element and a Cu element.

18. The inductor component according to claim 1, wherein the conductive protection film has a higher hardness than the magnetic powder.

19. The inductor component according to claim 1, wherein the conductive protection film has a lower hardness than the magnetic powder.

20. The inductor component according to claim 1, wherein the plurality of magnetic powders include a magnetic powder having a higher hardness than the conductive protection film and a magnetic powder having a lower hardness than the conductive protection film.

* * * * *